United States Patent
Lim et al.

(10) Patent No.: US 9,555,687 B2
(45) Date of Patent: Jan. 31, 2017

(54) COLD-STORAGE HEAT EXCHANGER

(75) Inventors: Hong-Young Lim, Daejeon (KR); Kwang Hun Oh, Daejeon (KR); Yong Jun Jee, Daejeon (KR); Young-Ha Jeon, Daejeon (KR); Jin Hyuck Kim, Daejeon (KR); Duck-Ho Lee, Daejeon (KR); Jun Young Song, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 398 days.

(21) Appl. No.: 14/115,536

(22) PCT Filed: Mar. 30, 2012

(86) PCT No.: PCT/KR2012/002378
§ 371 (c)(1),
(2), (4) Date: Nov. 4, 2013

(87) PCT Pub. No.: WO2012/150768
PCT Pub. Date: Nov. 8, 2012

(65) Prior Publication Data
US 2014/0069136 A1  Mar. 13, 2014

(30) Foreign Application Priority Data

May 4, 2011 (KR) .......... 10-2011-0042240
May 11, 2011 (KR) .......... 10-2011-0043890
May 20, 2011 (KR) .......... 10-2011-0047659

(51) Int. Cl.
*B60H 1/00* (2006.01)
*F28F 9/02* (2006.01)
(Continued)

(52) U.S. Cl.
CPC .......... *B60H 1/005* (2013.01); *B60H 1/00778* (2013.01); *F28D 1/05391* (2013.01);
(Continued)

(58) Field of Classification Search
CPC .... B60H 1/005; F28D 1/05391; F28D 20/021; F28D 20/0013; F28D 20/0008; F28F 1/126; F28F 9/0207
See application file for complete search history.

(56) References Cited

U.S. PATENT DOCUMENTS 3,878,888 A * 4/1975 Seidl ................. F28D 1/0535
165/128
6,145,589 A 11/2000 Gowan
(Continued)

FOREIGN PATENT DOCUMENTS

GB 844660 B 8/1960
JP 7-55379 A 3/1995
(Continued)

*Primary Examiner* — Allen Flanigan
*Assistant Examiner* — Filip Zec
(74) *Attorney, Agent, or Firm* — Novick, Kim & Lee, PLLC; Jae Youn Kim

(57) ABSTRACT

Provided is a cold-storage heat exchanger. The cold-storage heat exchanger includes a pair of header tanks, and tubes which are arranged in three rows with respect to the direction of the flow of air and connected at opposite sides thereof to the header tanks. A cold-storage medium is stored in the tubes that are disposed in a middle row, and refrigerant circulates through the tubes that are disposed in front and rear rows. Therefore, the cold-storage medium can effectively store cold-energy transferred from the refrigerant. When the engine of a vehicle is stopping, the cold-storage heat exchanger can discharge the cold-energy that has been stored into the passenger compartment of the vehicle, thus preventing the temperature in the passenger compartment from rapidly increasing, thereby creating pleasant air-conditioned conditions for a user, and minimizing the energy and time required to re-cool the passenger compartment.

18 Claims, 39 Drawing Sheets

(51) Int. Cl.
*F28D 1/053* (2006.01)
*F28D 20/02* (2006.01)
*F28D 1/04* (2006.01)
*F28F 1/12* (2006.01)
*F28D 21/00* (2006.01)
*F28D 20/00* (2006.01)

(52) U.S. Cl.
CPC ............ *F28D 20/02* (2013.01); *F28F 9/0207* (2013.01); *F28D 1/0435* (2013.01); *F28D 2020/0004* (2013.01); *F28D 2020/0013* (2013.01); *F28D 2021/0085* (2013.01); *F28F 1/126* (2013.01); *Y02E 60/145* (2013.01)

(56) References Cited

U.S. PATENT DOCUMENTS

| | | | |
|---|---|---|---|
| 2009/0025419 A1* | 1/2009 | Kerler | F25B 39/022 62/524 |
| 2009/0120624 A1 | 5/2009 | Lim et al. | |
| 2010/0223949 A1 | 9/2010 | Higashiyama et al. | |
| 2010/0307180 A1 | 12/2010 | Yamada et al. | |
| 2011/0154855 A1* | 6/2011 | Sasaki | F25B 39/022 62/524 |
| 2011/0239696 A1* | 10/2011 | Takagi | B60H 1/00335 62/524 |

FOREIGN PATENT DOCUMENTS

| | | |
|---|---|---|
| JP | 10-267585 A | 10/1998 |
| JP | 2006-170598 A | 6/2006 |
| JP | 2006-322699 A | 11/2006 |
| JP | 2009-97838 A | 5/2009 |
| JP | 2010-070071 A | 4/2010 |
| JP | 2010-126026 A | 6/2010 |
| JP | 2010-175167 A | 8/2010 |
| KR | 10-2004-0017474 A | 2/2004 |
| KR | 10-2007-0111390 A | 11/2007 |
| KR | 10-2009-0022204 A | 3/2009 |
| KR | 10-2011-0034145 A | 4/2011 |
| WO | 99/67592 A1 | 12/1999 |

\* cited by examiner

COLD-STORAGE HEAT EXCHANGER

TECHNICAL FIELD

The present invention relates to a cold-storage heat exchanger, and more particularly, to a cold-storage heat exchanger which includes a pair of header tanks each of which comprises three rows of parts with respect to a direction of the flow of air, and three rows of tubes that are fixed at opposite ends thereof to the header tanks, wherein a cold-storage medium is stored in tubes disposed in a middle row, and refrigerant circulates in front and rear rows of tubes so that cold-energy of the refrigerant can be effectively stored in the cold-storage medium, and when an engine of a vehicle is in a stopped state, the cold-energy is discharged into the passenger compartment of the vehicle, thus preventing the temperature in the passenger compartment from rapidly increasing, thereby creating pleasant air-conditioned conditions for a user, and minimizing the energy and time required to re-cool the passenger compartment.

BACKGROUND ART

Recently, the growing interest in the environment and energy all over the world is encouraging research into improving fuel efficiency in the automobile industry. Research and development into reducing the weight and size and increasing performance have been being steadily conducted to fulfill different kinds of consumer demands. Particularly, research and development into hybrid vehicles which use engine power and electric energy together are increasing.

Many kinds of hybrid vehicles use an idle stop/go system in which an engine automatically stops when a vehicle stops, for example, while waiting for the light to change, and manipulating a transmission restarts the engine. However, because such a hybrid vehicle also uses the engine to operate the air-conditioning apparatus, when the engine is stopping, a compressor also stops, increasing the temperature of an evaporator, resulting in making a user feel unpleasant. Furthermore, refrigerant in the evaporator easily evaporates even at room temperature. Hence, if the refrigerant evaporates during the time for which the compressor is not in operation, even though the engine is restarted, and the compressor and the evaporate are re-operated, it takes a relatively long time to supply cold air into the passenger compartment because it is necessary to compress the evaporated refrigerant and re-liquefy it. In addition, this causes the problem of an increase of the overall energy consumption.

In an effort to improve air-conditioning efficiency, a related technique was proposed in Japanese Patent Laid-open Publication No. 2000-205777 (entitled: Cold-storage heat exchanger). This technique is illustrated in FIG. 1.

As shown in FIG. 1, the cold-storage heat exchanger 90 includes tubes 91, each of which has a double tube structure and is integrally configured such that a refrigerant passage 91e through which refrigerant flows and cold-storage-medium chambers 91f and 91f are defined in the double-layered tube 91. Fluid passages 94 are formed between the tubes 91 so that heat can be transferred between the refrigerant and fluid passing through the fluid passages 94.

However, in the conventional cold-storage heat exchanger of FIG. 1, manufacturing the double-layered tube includes joining several sheets of plates. Defective joining frequently occurs. The double tube structure makes the manufacture of the tube difficult. The problem of defective joining is accompanied by a problem of the refrigerant mixing with the cold-storage medium. In addition, even if there is a defectively joined portion, it is very difficult to find such a portion.

Moreover, although the conventional cold-storage heat exchanger has an advantage in that the cold-storage medium receives cold energy from the refrigerant because the passage along which the refrigerant flows is disposed at an inside position in the double tube structure while the cold-storage-medium chamber that stores the cold-storage medium is disposed at an outside position in the double tube structure, this double tube structure reduces the efficiency of heat transfer between the refrigerant and air that passes over the outside of the double tube structure and comes into contact with the cold-storage-medium chamber. Further, the fins that are disposed outside the double-layered tubes also come into contact only with the cold-storage-medium chamber without making direct connect with the refrigerant passage. In addition, this double tube structure restricts the size of the space in which the cold-storage medium can be stored, thus resulting in reducing the heat exchange efficiency.

FIG. 2 illustrates another conventional technique, showing a plate type cold-storage heat exchanger 80 which has a structure of three rows with a cold-storage medium stored in a middle row. In this cold-storage heat exchanger, a part for storing a cold-storage medium is disposed between front and rear rows of tubes 81 each of which is formed by joining plates 82. This conventional technique has the advantage of improving the efficiency with which cold energy of the refrigerant is stored in the cold-storage medium, but given the characteristics of the plate type, it is difficult to provide a sufficient space for storing the cold-storage medium. Therefore, the amount of cold-storage medium is insufficient, making it difficult to ensure satisfactory cold-energy storage performance. Furthermore, the durability and the corrosion resistance are comparatively low, reducing the lifetime of the cold-storage heat exchanger.

DISCLOSURE OF INVENTION

Technical Problem

An object of the present invention is to provide a cold-storage heat exchanger in which a separate part for storing a cold-storage medium is provided between front and rear rows of tubes so that cold energy of refrigerant can be effectively stored and, when the engine of a vehicle is in the stopped state, the cold energy that has been stored is discharged into the passenger compartment, thus preventing the temperature in the passenger compartment from rapidly increasing thereby creating pleasant air-conditioned conditions for a user, and minimizing the energy and time required to re-cool the passenger compartment.

Another object of the present invention is to provide a cold-storage heat exchanger which uses tubes of the same height so that each fin interposed between the tubes can be integrally formed, thus enhancing the productivity with which the cold-storage heat exchanger is manufactured.

A further object of the present invention is to provide a cold-storage heat exchanger in which the cold-storage medium is disposed at the central portion of the exchanger, so that air conditioning can take place instantaneously immediately after an air conditioner has been operated, and in which the amount of cold-storage medium which can be stored is increased compared to that of the plate type cold-storage heat exchanger, so that the performance of storage of cold-energy can be enhanced.

Yet another object of the present invention is to provide a cold-storage heat exchanger in which a baffle is installed at a predetermined position in a header tank and partitions all of spaces of first, second and third rows so that the refrigerant that is in the first and third rows of tubes can be prevented from mixing with the cold-storage medium that is stored in the second row of tubes, and a communication passage formed by the baffle defines a path along which the refrigerant flows between the first and third rows, thus facilitating the formation of the communication passage.

Still another object of the present invention is to provide a cold-storage system which can maintain the cold-storage medium, stored in the cold-storage part of the cold-storage heat exchanger, in a state suitable for the function of storing cold-energy, and which can enhance the performance of heat exchange and cold-energy storage of the cold-storage heat exchanger.

Solution to Problem

In one general aspect, a cold-storage heat exchanger includes: a first header tank and a second header tank provided parallel to each other at positions spaced apart from each other by a predetermined distance, each of the first and second header tanks having therein partitions extending in a longitudinal direction so that a space in each of the first and second header tanks is partitioned with respect to a lateral direction into three spaces comprising a first space, a second space and a third space; a plurality of tubes arranged in three rows with respect to the lateral direction, the tubes comprising: refrigerant tubes through which refrigerant circulates, each of the refrigerant tubes being connected at opposite ends thereof to the first spaces of a first row or the third spaces of a third row; and a cold-storage tubes connected at opposite ends thereof to the second spaces of a second row, the cold-storage tubes storing a cold-storage medium therein; fins interposed between the tubes; and an inlet pipe and an outlet pipe each provided on the first header tank or the second header tank so that the refrigerant flows into the cold-storage heat exchanger through the inlet pipe and flows out therefrom through the outlet pipe.

Further, a refrigerant passing hole may be formed in a predetermined portion of each of laterally-opposite sidewalls of the second space of at least either the first header tank or the second header tank so that the first space communicates with the third space to allow the refrigerant to flow between the first space and the third space. The cold-storage heat exchanger may further include partitioning means for isolating the refrigerant flowing between the first space and the third space from the heat storage medium stored in the cold-storage tubes.

The second space may be partitioned with respect to a height direction by the partitioning means into a primary-second space and a secondary-second space formed above the primary-second space, wherein the primary-second space may communicate with the cold-storage tubes, and the refrigerant passing holes may be disposed in the secondary-second space.

The cold-storage heat exchanger may include: a first heat exchange part in which the refrigerant circulates along the tubes that communicate with the first spaces; a second heat exchange part in which the refrigerant circulates along the tubes that communicate with the third spaces; and a cold-storage part in which the cold-storage medium is stored in the tubes that communicate with the primary-second space.

The partitioning means may include a separate planar member extending in the longitudinal direction so that the second space is partitioned into sections with respect to a height direction, wherein laterally-opposite edges of the planar member may be bent so that the planar member is installed in the second space of the first header tank or the second header tank.

The partitioning means may have a shape of a tube connecting the refrigerant passing holes to each other.

Each of the inlet pipe and the outlet pipe may be connected to the first space or the third space of the first or second header tank.

The inlet pipe or the outlet pipe may communicate with the secondary-second space of the first header tank or the second header tank.

The refrigerant passing holes may include: inflow branch holes formed in the secondary-second space communicating with the inlet pipe; and outflow branch holes formed in the secondary-second space communicating with the outlet pipe.

The inflow branch holes may be formed in the partitions disposed in an area in which the refrigerant drawn into the inlet pipe branches off into the first space and the third space. The outflow branch holes may be formed in the partitions disposed in an area in which the refrigerant that has passed through the first heat exchange part and the second heat exchange part is drawn into the first space and the third space and discharged into the outlet pipe.

The inflow branch holes may comprise a first inflow branch hole communicating with the first space, and a second inflow branch hole communicating with the third space, and the outflow branch holes may comprise a first outflow branch hole communicating with the first space, and a second outflow branch hole communicating with the third space, wherein the first inflow branch hole comprises at least one first inflow branch hole, the second inflow branch hole comprises at least one second inflow branch hole, the first outflow branch hole comprises at least one first outflow branch hole, and the second outflow branch hole comprises at least one second outflow branch hole.

The cold-storage heat exchanger may further include: a pipe connector provided on an outer surface of one side with respect to the longitudinal direction of the cold-storage heat exchanger, the pipe connector comprising: a first pipe connector communicating with the secondary-second space formed in either the first header tank or the second header tank, so that the refrigerant flows through the first pipe connector, the first pipe connector being connected to the inlet pipe; and a second pipe connector communicating with the secondary-second space formed in a remaining one of the first header tank and the second header tank, so that the refrigerant flows through the second pipe connector, the second pipe connector being connected to the outlet pipe.

The first pipe connector and the second pipe connector may be configured such that the inlet pipe and the outlet pipe are disposed parallel to each other at positions adjacent to each other.

The cold-storage heat exchanger may further include: a first pipe disposed outside the first header tank and provided parallel to the first header tank in the longitudinal direction; a second pipe disposed outside the second header tank and provided parallel to the second header tank in the longitudinal direction; a primary-first branch pipe and a secondary-first branch pipe branching off from the first pipe, the primary-first branch pipe extending to the first space of the first header tank while the secondary-first branch pipe extends to the third space of the first header tank; and a primary-second branch pipe and a secondary-second branch pipe branching off from the second pipe, the primary-second branch pipe extending to the first space of the second header tank while the secondary-second branch pipe extends to the third space of the second header tank, wherein the first pipe is connected to either the inlet pipe or the outlet pipe, and the second pipe is connected to a remaining one of the inlet pipe or the outlet pipe, so that the refrigerant flows into one of the first pipe and the second pipe or out of a remaining one of the first pipe and the second pipe.

The cold-storage heat exchanger may further include: partitioning means provided in either the first header tank or the second header tank, the partitioning means for partitioning the first space, the second space and the third space with respect to the longitudinal direction to define a partitioned section in each of the first, second and third spaces, wherein the refrigerant passing holes are disposed in the second space in the partitioned section defined by the partitioning means, and the refrigerant flows through the cold-storage tubes and the refrigerant tubes that are disposed at positions corresponding to the partitioned sections of the first, second and third spaces, the partitioned sections being defined by the partitioning means and having the refrigerant passing holes therein.

The partitioning means may be configured such that a number of lines of tubes disposed at the positions corresponding to the partitioned sections is at least one and is 25% or less of total lines of tubes.

The cold-storage heat exchanger may further include a sealing baffle provided at a position adjacent to each of openings, the openings being formed in opposite ends of each of the first header tank and the second header tank, or an end cap sealing each of the openings.

A cold-storage-medium injection hole may be formed in the second space so that the cold storage medium is injected into the second space through the cold-storage-medium injection hole.

Each of the first header tank and the second header tank may be formed by coupling a header to a tank cover plate, each of the header and the tank cover plate being formed by extruding, wherein the partitions are provided in the header or the tank cover plate so that the space in each of the first and second header tanks is partitioned into the first space, the second space and the third space, and the partitioning means is formed in the second space in the longitudinal direction by integrally extruding the partitioning means with the header or the tank cover plate.

Each of the first header tank and the second header tank may be formed by integrally extruding a header and a tank cover plate, the header and tank cover plate defining the first space, the second space and the third space, and the partitioning means may be formed in the second space in the longitudinal direction by integrally extruding the partitioning means with the header or the tank cover plate.

The tubes arranged in the three rows may be integrally extruded at a same time.

The fins interposed between the tubes arranged in the three rows may be integrally formed.

In another general aspect, a cold-storage system having the cold-storage heat exchanger includes: a reservoir storing a cold-storage medium; a circulation pump circulating the cold-storage medium between the reservoir and cold-storage tubes of the cold-storage heat exchanger; a control unit controlling the circulation pump; and a circulation pipe connecting the reservoir, the circulation pump and the cold-storage tubes of the cold-storage heat exchanger to one another.

Advantageous Effects of Invention

In a cold-storage heat exchanger according to the present invention, a separate part for storing a cold-storage medium is provided between front and rear rows of tubes. Therefore, the cold energy of a refrigerant can be effectively stored. When the engine of a vehicle is in the stopped state, the cold energy that has been stored is discharged into the passenger compartment, thus preventing the temperature in the passenger compartment from rapidly increasing thereby creating pleasant air-conditioned conditions for a user, and minimizing the energy and time required to re-cool the passenger compartment of the vehicle.

Furthermore, the cold-storage heat exchanger uses the tubes of the same height so that each fin interposed between the tubes can be integrally formed, thus enhancing the productivity with which the cold-storage heat exchanger is manufactured.

In addition, the cold-storage medium is disposed at the central portion of the exchanger. Thus, air conditioning can take place instantaneously immediately after an air conditioner has been operated. The amount of cold-storage medium which can be stored is increased compared to that of the plate type cold-storage heat exchanger, so that the performance of the storage of cold-energy can be enhanced.

Moreover, a baffle is installed at a predetermined position in a header tank and partitions all of spaces of the first, second and third rows so that the refrigerant that is in the first and third rows of tubes can be prevented from mixing with the cold-storage medium that is stored in the second row of tubes. Further, a communication passage formed by the baffle defines a path along which the refrigerant flows between the first and third rows, thus facilitating the formation of the communication passage along.

A cold-storage system including the cold-storage heat exchanger according to the present invention can maintain the cold-storage medium, stored in the cold-storage part of the cold-storage heat exchanger, in a state suitable for the function of storing cold-energy. Further, the cold-storage system can enhance the performance of heat exchange and the performance of cold-energy storage of the cold-storage heat exchanger.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
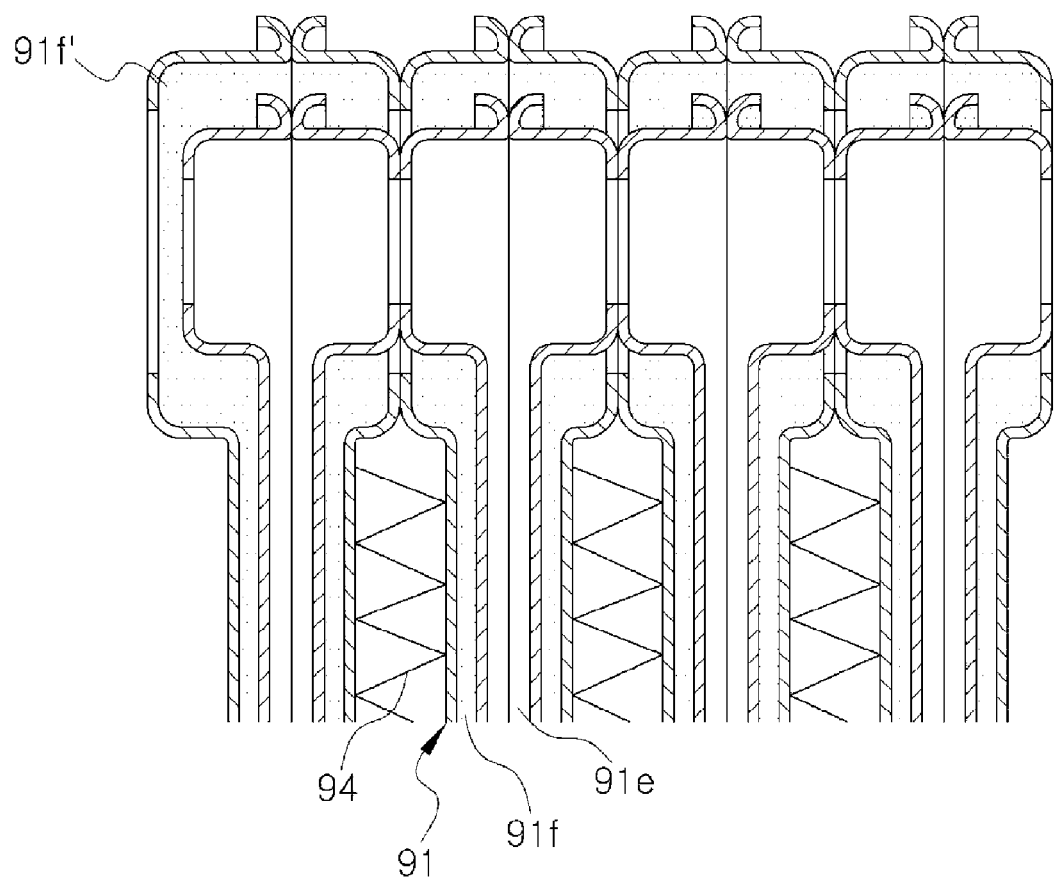
FIG. 1 is a perspective view of a conventional cold-storage heat exchanger having a double pipe structure.
Figure 2:
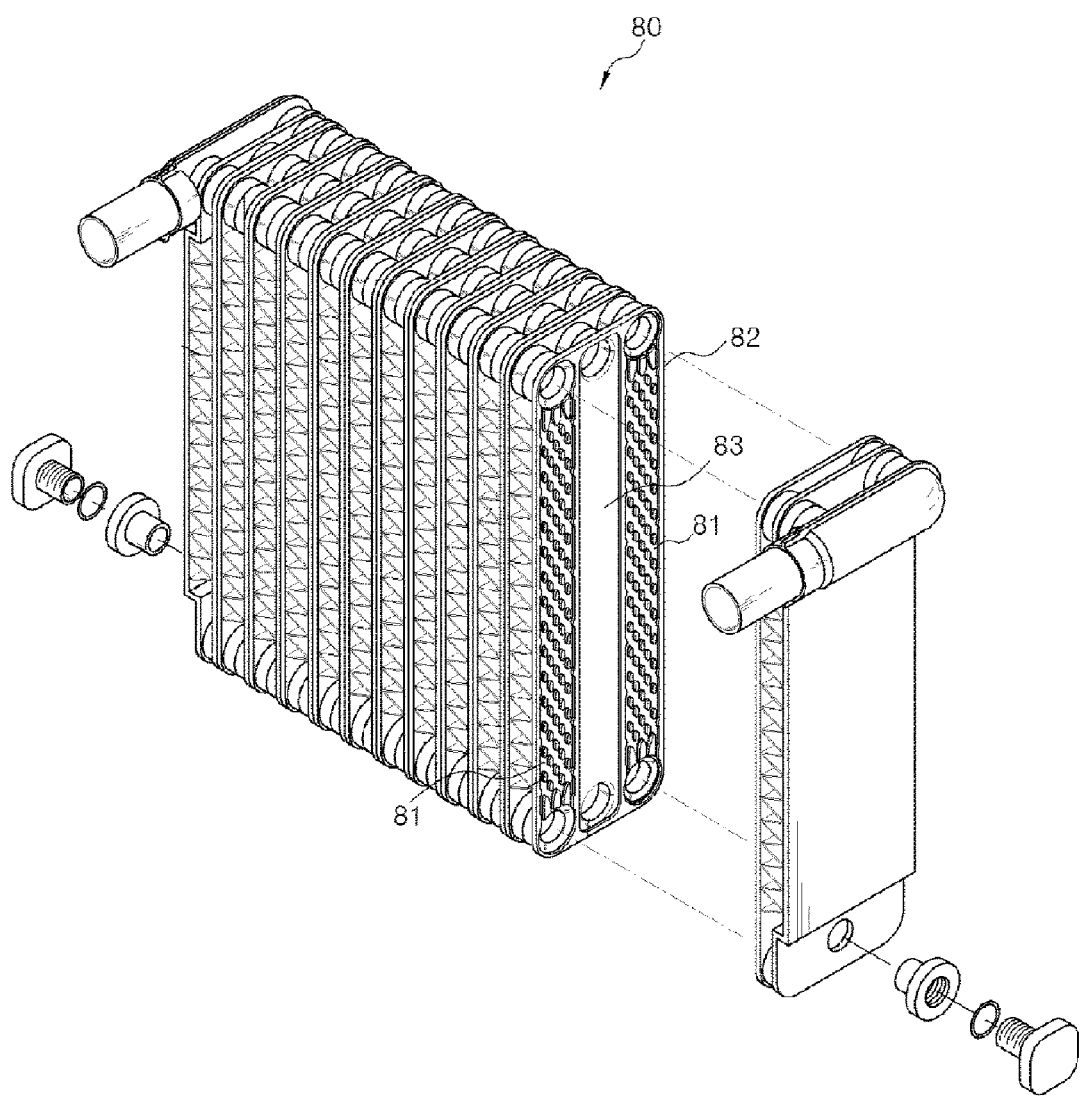
FIG. 2 is a perspective view of a conventional plate type cold-storage heat exchanger.
Figure 3:
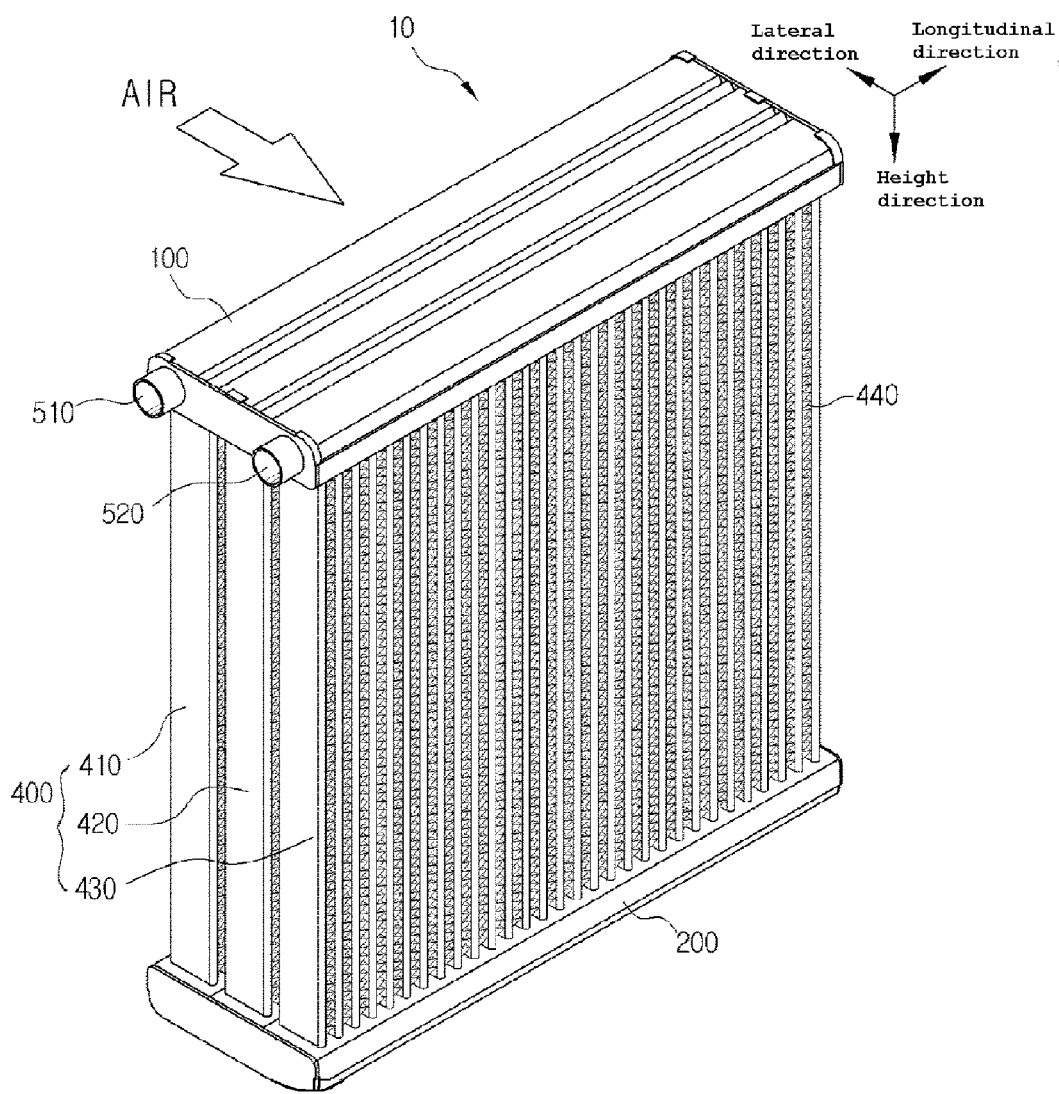
FIGS. 3 through 5 are respectively a perspective view, an exploded perspective view and a front view illustrating a cold-storage heat exchanger, according to an embodiment of the present invention.

1: cold-storage system 2: reservoir
3: circulation pump 4: control unit
5: circulation pipe 10: cold-storage heat exchanger
100, 200: first header tank, second header tank
110: header 120: tank cover plate
130: opening
310, 320, 330: first space, second space, third space
321: primary-second space 322: secondary-second space
340: refrigerant passing hole
350: inflow branch hole
351, 352: first inflow branch hole, second inflow branch hole
360: outflow branch hole
361, 362: first outflow branch hole, second outflow branch hole
370: partition 380: cold-storage-medium injection hole
390: stopper 400: tube
410, 430: refrigerant tube 420: cold-storage tube
440: fin 510, 520: inlet pipe, outlet pipe
610: partitioning means 620: baffle
630: sealing baffle 640: insert slot
650: coupling slot 660: end cap
710, 720, 730: first heat exchange part, second heat exchange part, cold-storage part
741, 742: first flow path, second flow path
800: pipe connector
810, 820: first pipe connector, second pipe connector
910, 920: first pipe, second pipe
911, 912: primary-first branch pipe, secondary-first branch pipe
921, 922: primary-second branch pipe, secondary-second branch pipe

BEST MODE FOR CARRYING OUT THE INVENTION

Hereinafter, the embodiments of the present invention will be described in detail with reference to the accompanying drawings.

A cold-storage heat exchanger 10 according to the present invention includes a first header tank 100, a second header tank 200, tubes 400, fins 440, an inlet pipe 510 and an outlet pipe 520.

Figure 7:
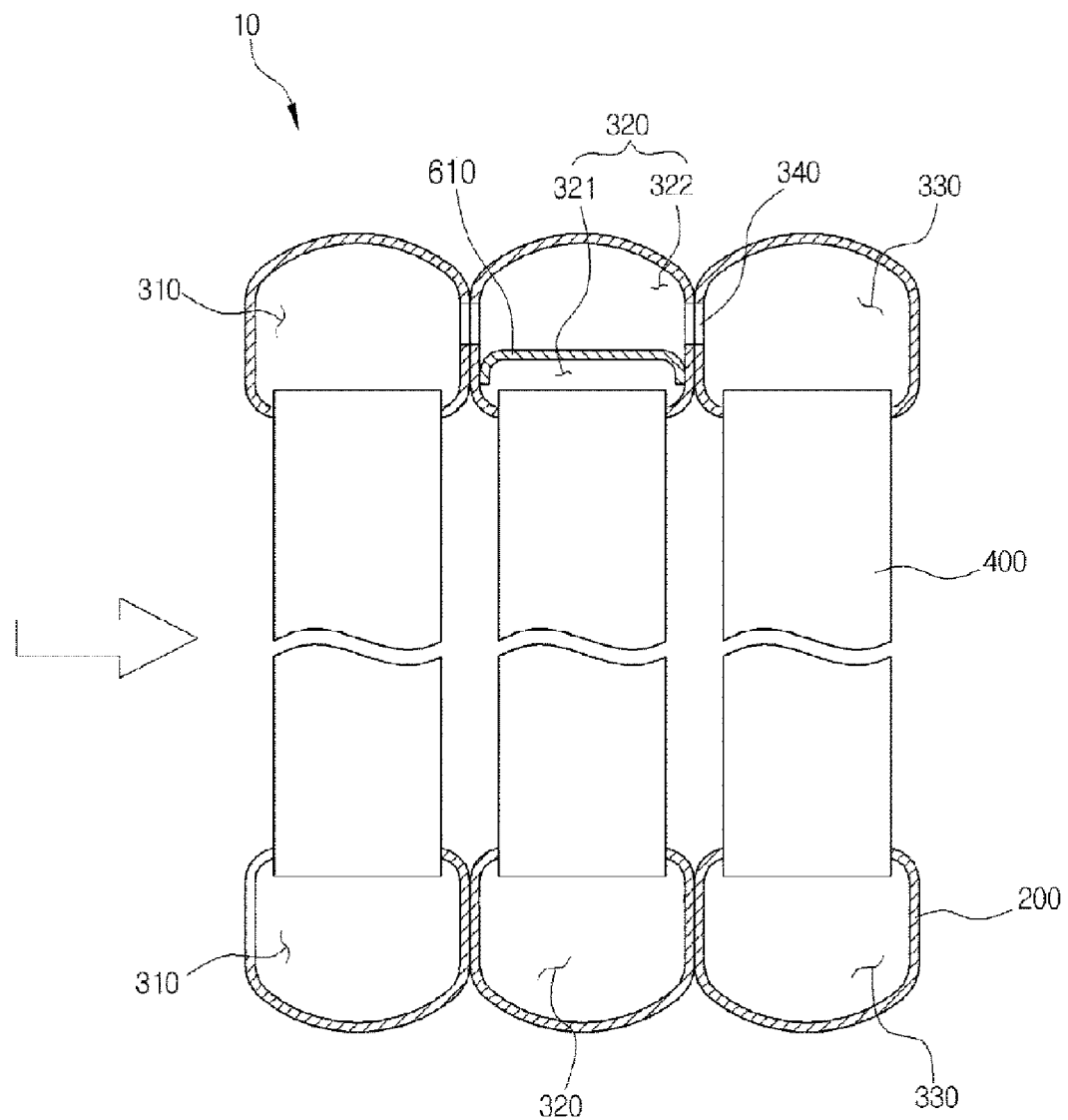

Particularly, as shown in FIG. 7, the first header tank 100 and the second header tank 200 of the cold-storage heat exchanger 10 are spaced apart from each other by a predetermined distance in the height direction and are parallel to each other. The internal space of each of the first and second header tanks 100 and 200 is separated into three spaces with respect to the lateral direction by partitions 370 which are provided in the header tank 100, 200 and extend in the longitudinal direction. The three spaces comprise a first space 310, a second space 320 and a third space 330.

The tubes 400 are arranged in three rows in the lateral direction. The tubes 400 comprise refrigerant tubes 410 and 430 which are respectively fixed at opposite ends thereof to the first and third spaces 310 and 330 and allow refrigerant to circulate through them, and cold-storage tubes 420 which are fixed at opposite ends thereof to the second spaces 320 and in which a cold-storage medium is stored.

The cold-storage heat exchanger 10 is preferably configured such that the tubes 400 that are arranged in three rows have the same height, width and shape.

Furthermore, when manufacturing the cold-storage heat exchanger 10, the tubes 400 that are arranged in three rows may be formed by extruding at the same time and may be integrally connected to each other. In this case, the manufacture and assembly of cold-storage heat exchanger 10 can be facilitated.

The fins 440 are interposed between the tubes 400, wherein each fin 440 is interposed between corresponding two of the tubes 400 that are arranged in three rows and is integrally formed, so that heat exchange between the cold-storage tube 420 and the refrigerant tubes 410 and 430 can be conducted by the fins 440. Further, the integrated structure of the fin 440 facilitates its manufacture.

The cold-storage heat exchanger 10 of the present invention may further include a baffle 620 which is provided in each of the first and third spaces 310 and 330 to control the flow of refrigerant.

Particularly, in the cold-storage heat exchanger 10 of the present invention, a refrigerant passing hole 340 is formed in a predetermined portion of each of laterally opposite sidewalls of the second space 320 of either the first header tank 100 or the second header tank 200 so that the first space 310 can communicate with the third space 330 to allow the refrigerant to flow between the first and third spaces 310 and 330. The cold-storage heat exchanger 10 further includes a separate partitioning means 610 that isolates the refrigerant that flows between the first space 310 and the third space 330 from the heat storage medium stored in the cold-storage tubes 420.

Thereby, in the cold-storage heat exchanger 10 of the present invention, the refrigerant can circulate through the refrigerant tubes 410 and 430 without being mixed with the heat storage medium stored in the cold-storage tubes 420.

Figure 4:
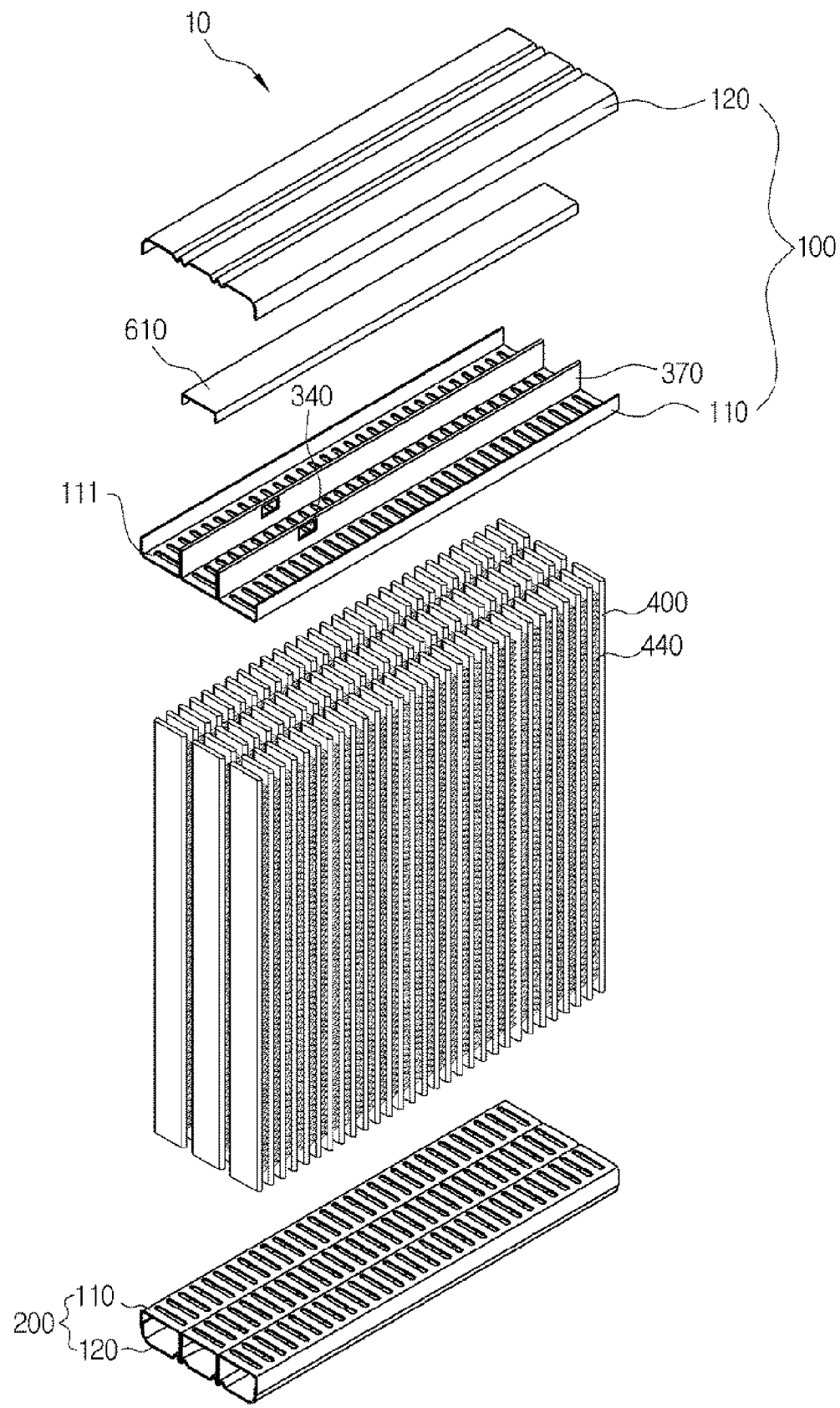
Figure 5:
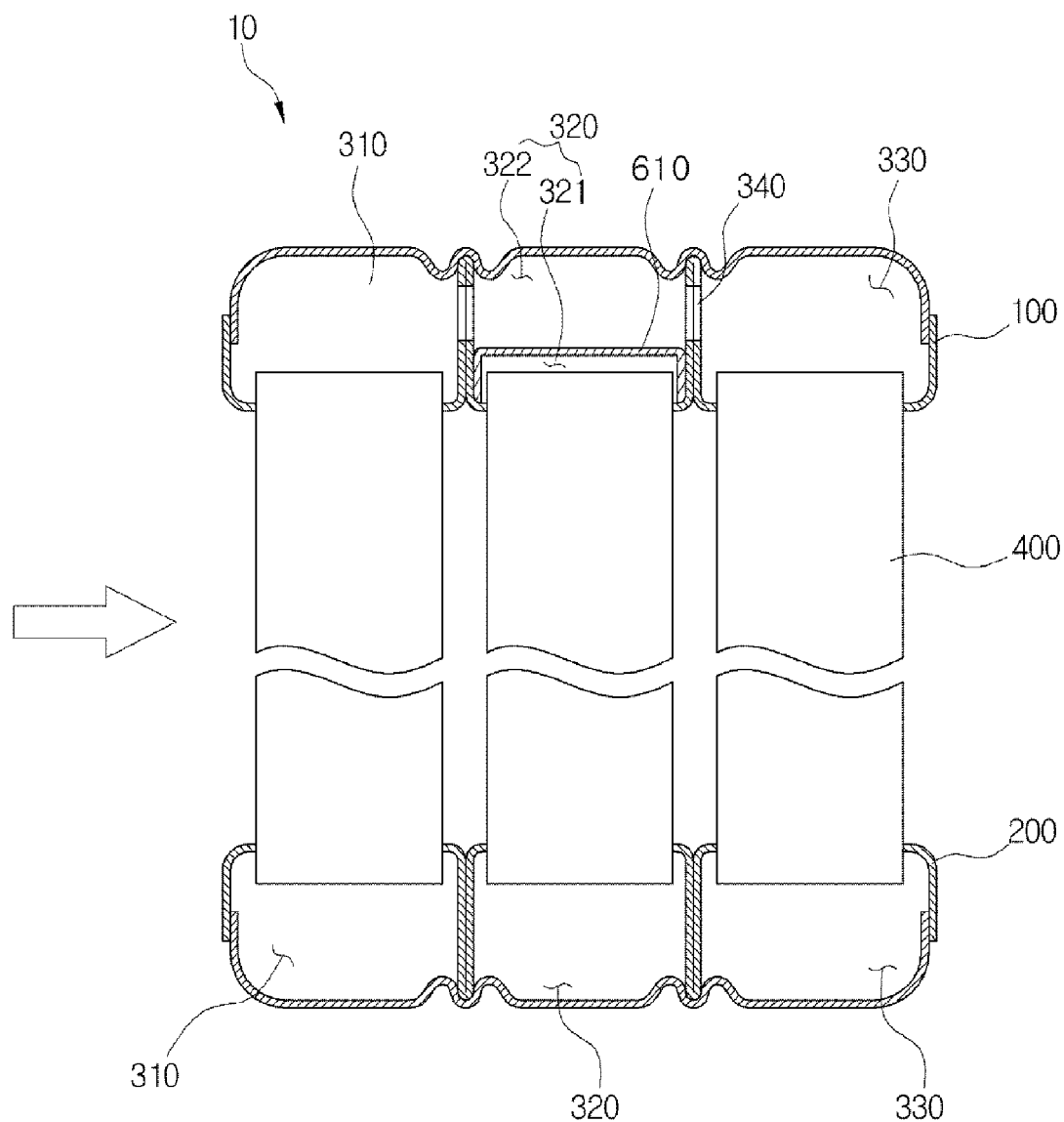

As shown in FIGS. 4 and 5 illustrating an embodiment of the cold-storage heat exchanger 10 of the present invention, each of the first and second header tanks 100 and 200 may be formed by coupling a header 110 and a tank cover plate 120 to each other. Here, each of the header 110 and the tank cover plate 120 has an integrated structure. The partitions 370 that extend in the longitudinal direction are provided in either the header 110 or the tank cover plate 120 so that the internal space of the header tank 100, 200 is partitioned into the first space 310, the second space 320 and the third space 330.

As shown in FIG. 5, the partitions 370 may protrude from the inner surface of the header 110. Alternatively, the partitions 370 may be provided in the tank cover plate 120.

Each of the header 110 and the tank cover plate 120 can be formed by a pressing process. The header 110 and the tank cover plate 120 are brazed to each other, forming the first header tank 100 or the second header tank 200.

In each of the first and second header tanks 100 and 200, tube insert holes 111 are formed in the header 110 by a cutting or pressing process so that the tubes 400 are inserted into the header 110 through the tube insert holes 111. The refrigerant passing hole 340 is formed in each of the partitions 370 that are provided in either the header 110 or the tank cover plate 120. In this state, the header 110 and the tank cover plate 120 are coupled to each other, forming the first header tank 100 or the second header tank 200.

Figure 6:
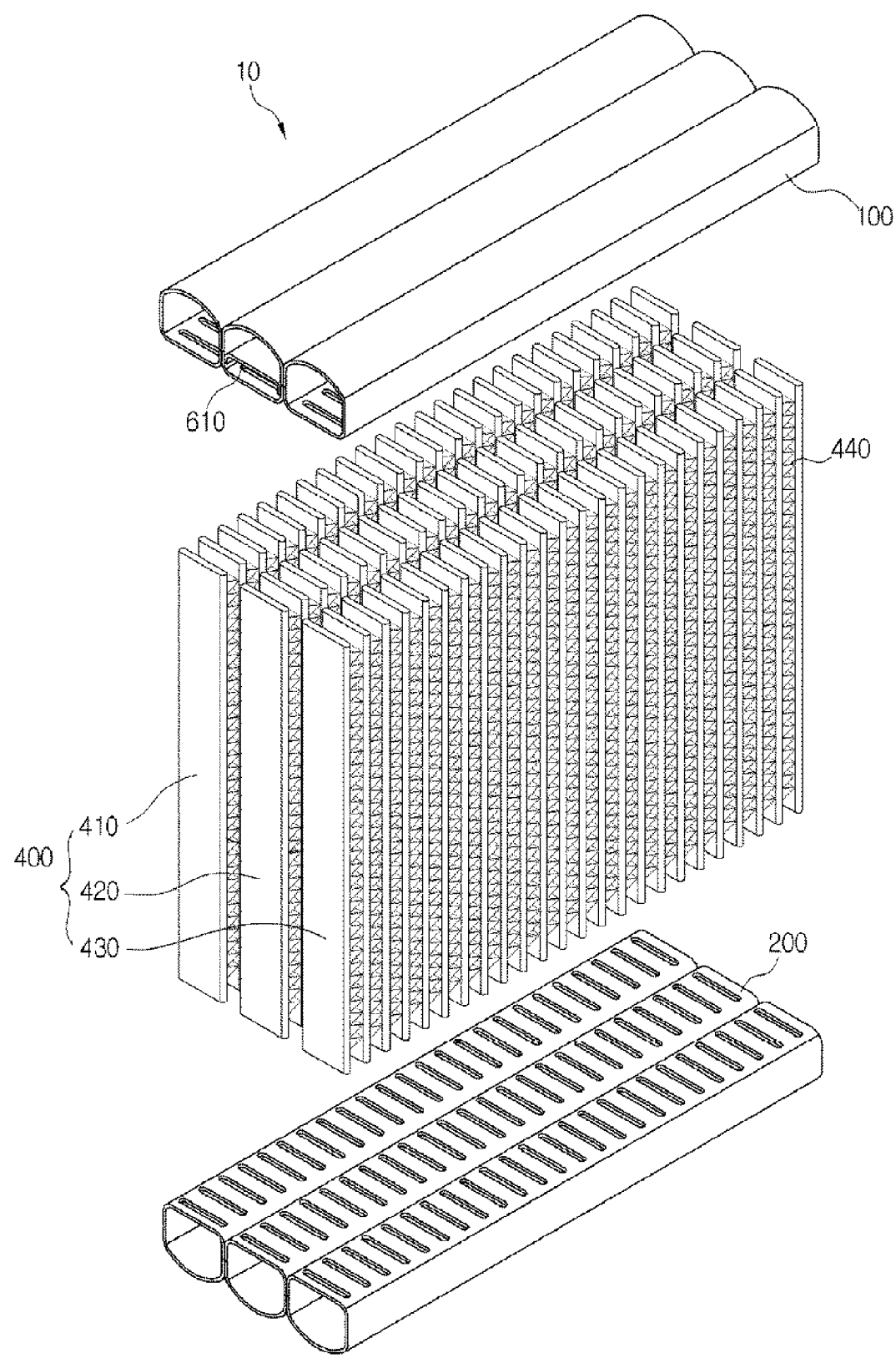
FIGS. 6 and 7 are respectively an exploded perspective view and a front view illustrating a cold-storage heat exchanger, according to another embodiment of the present invention.

Furthermore, as shown in FIGS. 6 and 7 illustrating another embodiment of the cold-storage heat exchanger 10, each of the first and second header tanks 100 and 200 may be formed in such a way that a header 110 and a tank cover plate 120 which form each of the first space 310, the second space 320 and the third space 330 are integrally extruded into a single structure, and the three integrally-extruded structures are arranged in three rows and then coupled to each other.

That is, each of the first space 310, the second space 320 and the third space 330 is formed by integrally forming the corresponding header 110 and tank cover plate 120. The structures which separately define the first, second and third spaces 310, 320 and 330 are arranged in three rows and coupled to each other, thus forming the first header tank 100 or the second header tank 200.

Furthermore, each of the first header tank 100 and the second header tank 200 may be formed by integrally extruding the header 110, the tank cover plate 120 and the partitions 370. In this case, in each of the first header tank 100 and the second header tank 200, the refrigerant passing hole 340 may be formed by a separate process in each of the partitions 370 that partition the internal space of the header tank 100, 200 into the first space 310, the second space 320 and the third space 330.

Means for coupling the structures defining the first, second and third spaces 310, 320 and 330 to each other may be welding, and as well as welding, there can be many different kinds of means.

The cold-storage heat exchanger having the above-mentioned characteristics can be embodied in embodiments 1 through 9.

Embodiment 1

As shown in FIGS. 3 through 7, the cold-storage heat exchanger 10 of the present invention may include a partitioning means 610 which comprises a planar member extending in the longitudinal direction and partitions the second space 320 into two portions with respect to the height direction, wherein the second space 320 is partitioned by the partitioning means 610 into a primary-second space 321 which communicates with the cold-storage tubes 420 and a secondary-second space 322 which allows the refrigerant to circulate through the refrigerant passing holes 340.

In this embodiment, laterally-opposite edges of the partitioning means 610 are bent so that the partitioning means 610 can be installed in the second space 320 of the first header tank 100 or the second header tank 200. The partitioning means 610 can be installed in the second space 320 in such a way that it is longitudinally inserted into the second space 320.

Preferably, the length of the partitioning means 610 is the same as that of the second space 320.

Furthermore, it is not necessary for the partitioning means 610 to have a U shape in which the opposite edges thereof are bent. In other words, the partitioning means 610 can have any shape, so long as it can partition the second space 320 into two separate spaces.

In this embodiment of the cold-storage heat exchanger 10, the partitioning means 610 isolates the primary-second space 321 from the secondary-second space 322 so that the refrigerant can pass between the first space 310, the secondary-second space 322 and the third space 330 through the refrigerant passing holes 340.

Figure 14:
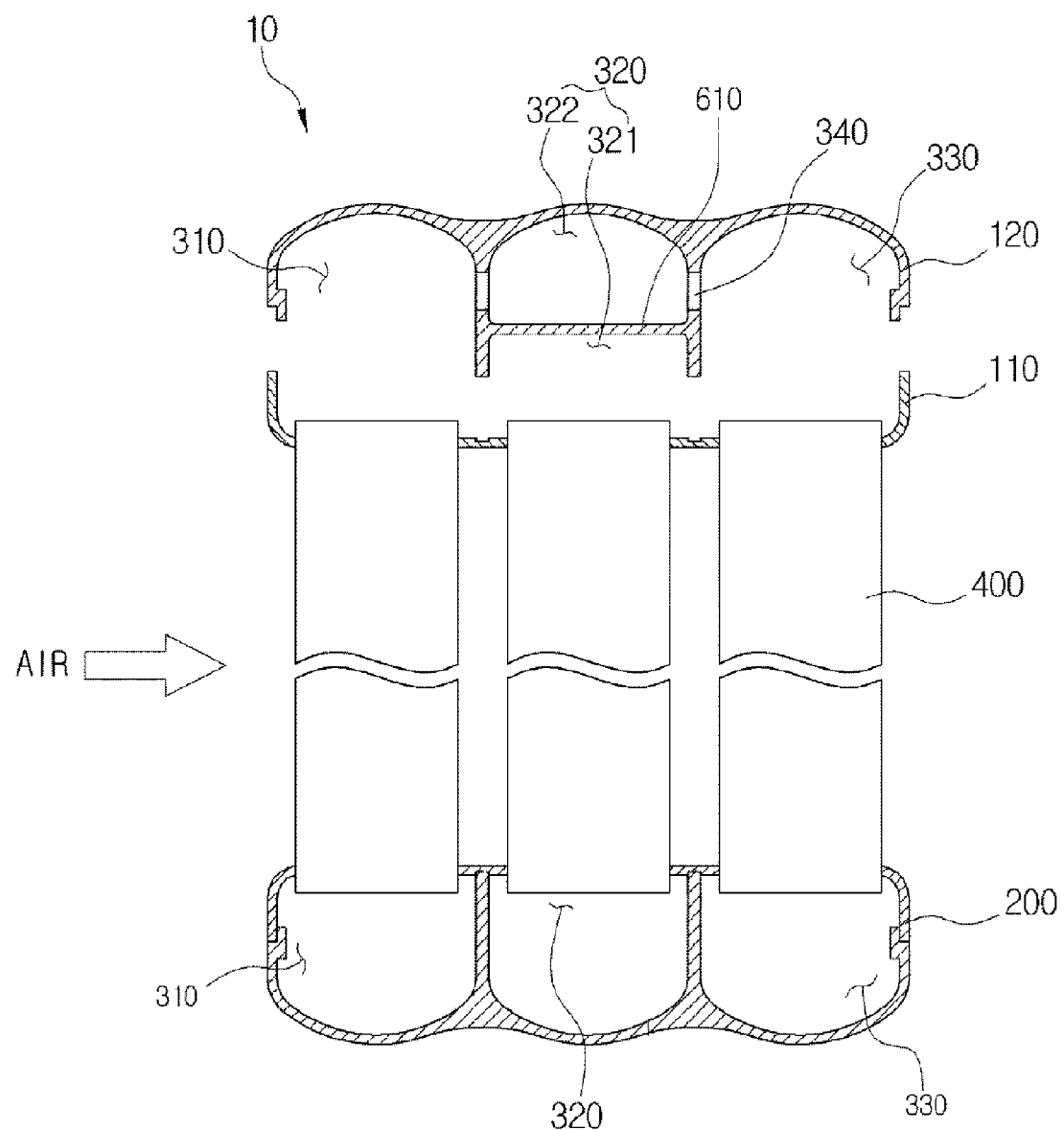
FIG. 14 is a front view illustrating a cold-storage heat exchanger, according to yet another embodiment of the present invention.

Similarly, as shown in FIG. 14, the cold-storage heat exchanger 10 may be configured such that the partitioning means 610 comprises a planar part that is integrally formed with the partitions 370 which protrude from the inner surface of the tank cover plate 120.

In the cold-storage heat exchanger 10 of this case, the tank cover plate 120 can be integrally extruded with the partitions 370 and the partitioning means 610.

Alternatively, each of the first header tank 100 and the second header tank 200 may be formed in such a way that the header 110, the tank cover plate 120, the partitioning means 610 and the partitions 370 are integrally formed by extruding. In this case, the refrigerant passing holes 340 may be formed by a separate process in the predetermined portions of the respective partitions 370 that are disposed in the secondary-second space 322, so that the first space 310 and the third space 330 communicate with each other through the refrigerant passing holes 340.

Embodiment 2

Figure 8:
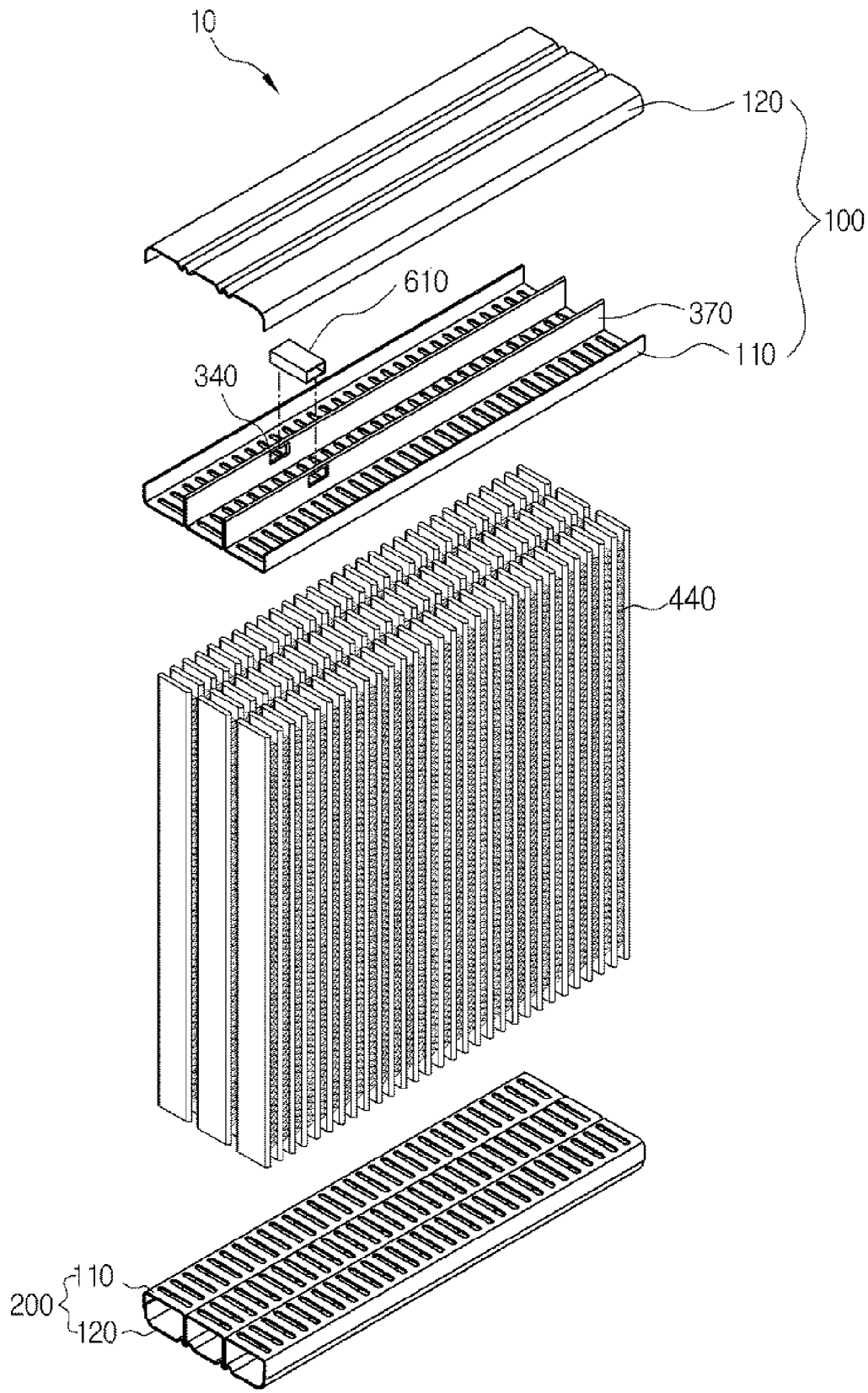
FIG. 8 is an exploded perspective view illustrating a cold-storage heat exchanger, according to a further embodiment of the present invention.

As shown in FIG. 8, the partitioning means 610 of the cold-storage heat exchanger 10 according to the preset invention may comprise a tubular partitioning means 610 which connects the refrigerant passing holes 340 to each other.

In the cold-storage heat exchanger 10 of this embodiment, the tubular partitioning means 610, which connects the refrigerant passing holes 340 that are formed in the laterally-opposite sidewalls of the second space 320 to each other, forms a passage for circulation of refrigerant between the first space 310 and the third space 330.

In this case, the passage for circulation of refrigerant can be easily formed using the partitioning means 610 in the second space 320 of the cold-storage heat exchanger 10.

Embodiment 3

In the cold-storage heat exchanger 10 of the present invention, either the inlet pipe 510 through which the refrigerant enters the cold-storage heat exchanger 10 or the outlet pipe 520 through which the refrigerant is discharged therefrom communicates with one of the first space 310 and the third space 330, and the other one of the inlet pipe 510 and the outlet pipe 520 communicates with the other one of the first space 310 and the third space 330.

Preferably, the inlet pipe 510 is disposed on one of the first and third spaces 310 and 330 that is disposed in the front row with respect to the direction of the flow of air, while the outlet pipe 520 is disposed on the other one of the first and third spaces 310 and 330 that is disposed in the rear row with respect to the direction of airflow.

In the cold-storage heat exchanger 10, the path along which the refrigerant circulates through the refrigerant tubes 410 and 430 can be variously changed depending on the locations of the inlet pipe 510, the outlet pipe 520 and the baffles 620. FIGS. 9 through 13 illustrate different examples of the path along which refrigerant circulates. Hereinafter, for the sake of explanation, it will be assumed that the header tank that is disposed at the upper position in the drawings is the first header tank 100, the header tank that is disposed at the lower position in the drawings is the second header tank 200, and the first space 310, the second space 320 and the third space 330 are arranged in order with respect to the direction of airflow.

The flow path of refrigerant in the cold-storage heat exchanger 10 shown in FIG. 9 will now be explained.

Figure 9:
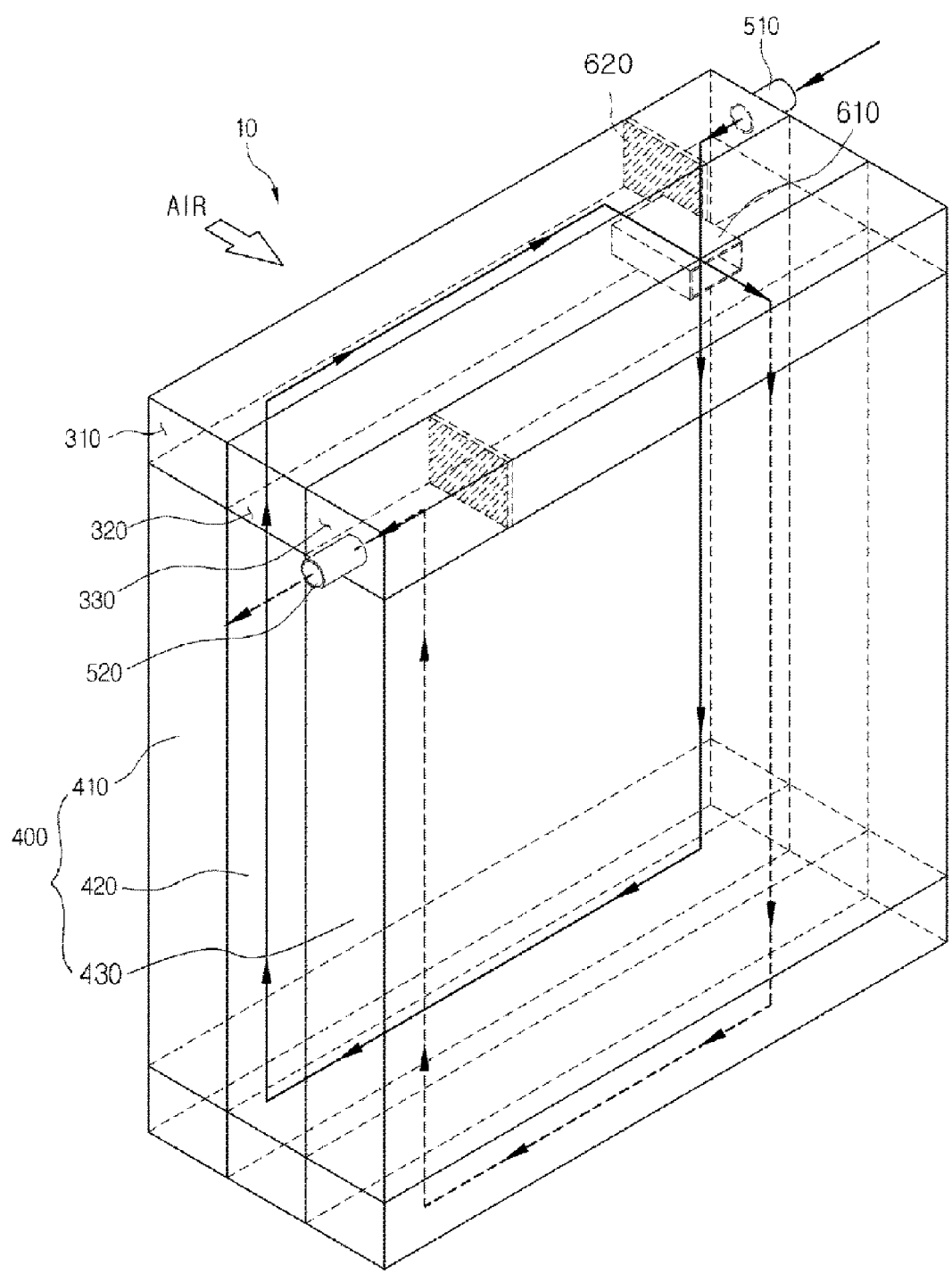
FIGS. 9 through 13 are views showing several embodiments of a path along which a heat exchanging medium circulates in the cold-storage heat exchanger of the present invention.

FIG. 9 illustrates the case where the inlet pipe 510 and the outlet pipe 520 are disposed on different sides of the cold-storage heat exchanger 10. Refrigerant is drawn into the cold-storage heat exchanger 10 through the inlet pipe 510 that communicates with the first space 310 of the first header tank 100. The drawn refrigerant moves downwards along the corresponding refrigerant tubes 410 that are fixed at the opposite ends thereof to the first spaces 310 of the first and second header tanks 100 and 200. Subsequently, the refrigerant passes through the first space 310 of the second header tank 200 and moves upwards again along the corresponding refrigerant tubes 410. Thereafter, the refrigerant enters the third space 330 of the first header tank 100 through the refrigerant passing holes 340 that are formed in the first space 310 and the third space 330 of the first header tank 100.

Subsequently, the refrigerant moves downwards along the corresponding refrigerant tubes 430 that are fixed at the opposite ends thereof to the third spaces 330 of the first and second header tanks 100 and 200. The refrigerant passes through the third space 330 of the second header tank 200 and then moves upwards again and enters the third space 330 of the first header tank 100. The refrigerant is thereafter discharged out of the cold-storage heat exchanger 10 through the outlet pipe 520 that communicates with the third space 330 of the first header tank 100.

In other words, the cold-storage heat exchanger 10 is configured such that refrigerant is drawn into the first space 310 and then discharged out of the cold-storage heat exchanger 10 via the third space 330. Here, the partitioning means 610 functions to prevent the refrigerant from being mixed with the cold-storage medium that is stored in the cold-storage tubes 420 that are fixed at the opposite ends of the second spaces 320 of the first and second header tanks 100 and 200.

Therefore, in the cold-storage heat exchanger 10, cold energy of the refrigerant, which circulates through the first and third rows of tubes 400 that are disposed at opposite sides in the direction of airflow, is transferred to and stored in the cold-storage medium that is disposed in the second row of tubes 400. Thereby, the cold-storage performance can be enhanced, so that a pleasant air-conditioned environment can be effectively maintained.

The flow of refrigerant in the cold-storage heat exchanger 10 of FIG. 10 will now be explained.

Figure 10:
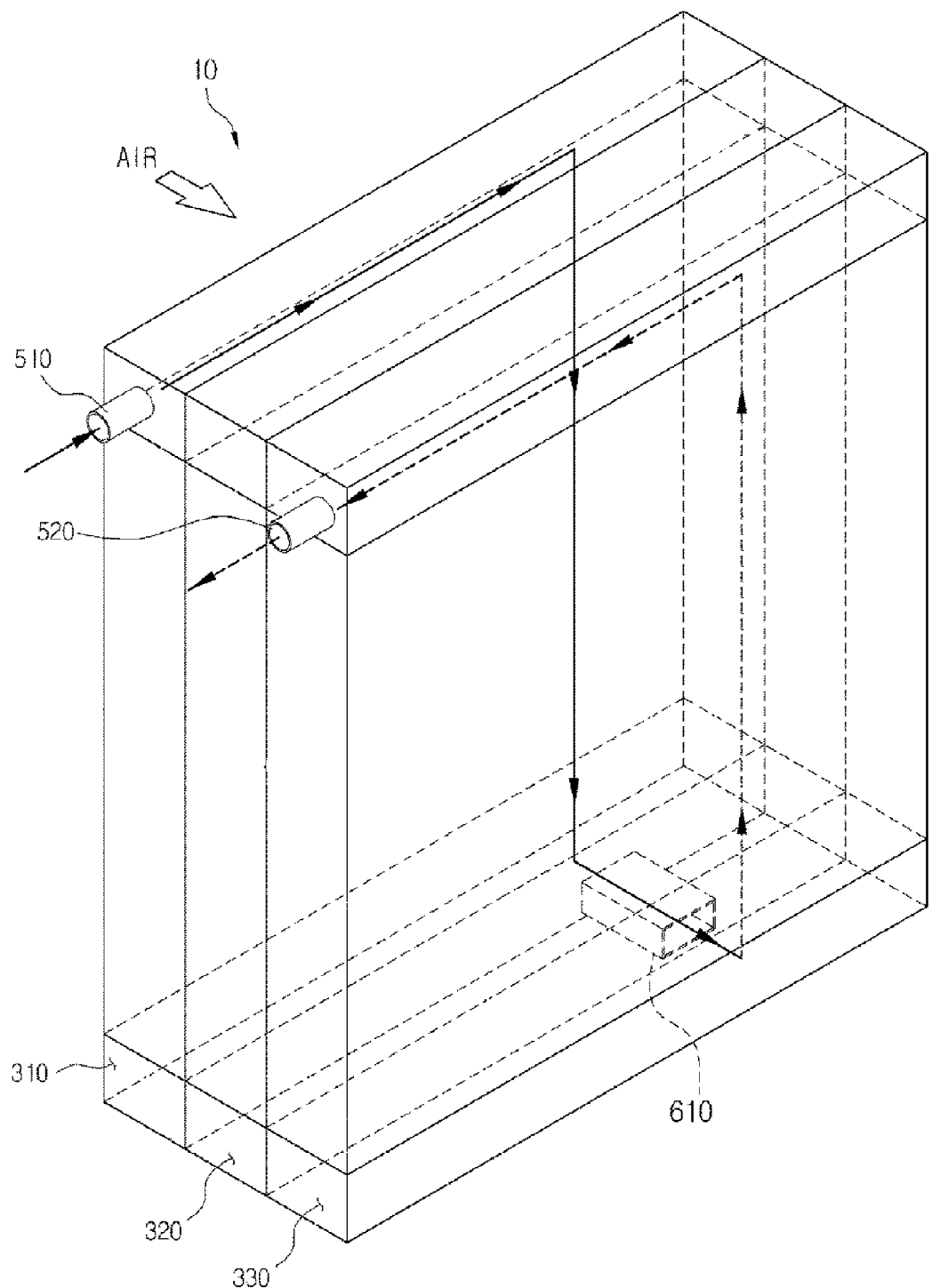

FIG. 10 illustrates the case where the inlet pipe 510 and the outlet pipe 520 are disposed on the same side of the cold-storage heat exchanger 10. Refrigerant is drawn into the cold-storage heat exchanger 10 through the inlet pipe 510 that communicates with the first space 310 of the first header tank 100. The drawn refrigerant moves downwards along the corresponding refrigerant tubes 410 and then enters the third space 330 of the second header tank 200 via the refrigerant passing holes 340 that are formed in the first space 310 and the third space 330 of the second header tank 200.

Thereafter, the refrigerant passes through the third space 330 of the second header tank 200 and then moves upwards again and enters the third space 330 of the first header tank 100. Subsequently, the refrigerant is discharged out of the cold-storage heat exchanger 10 through the outlet pipe 520 that communicates with the third space 330 of the first header tank 100.

Figure 11:
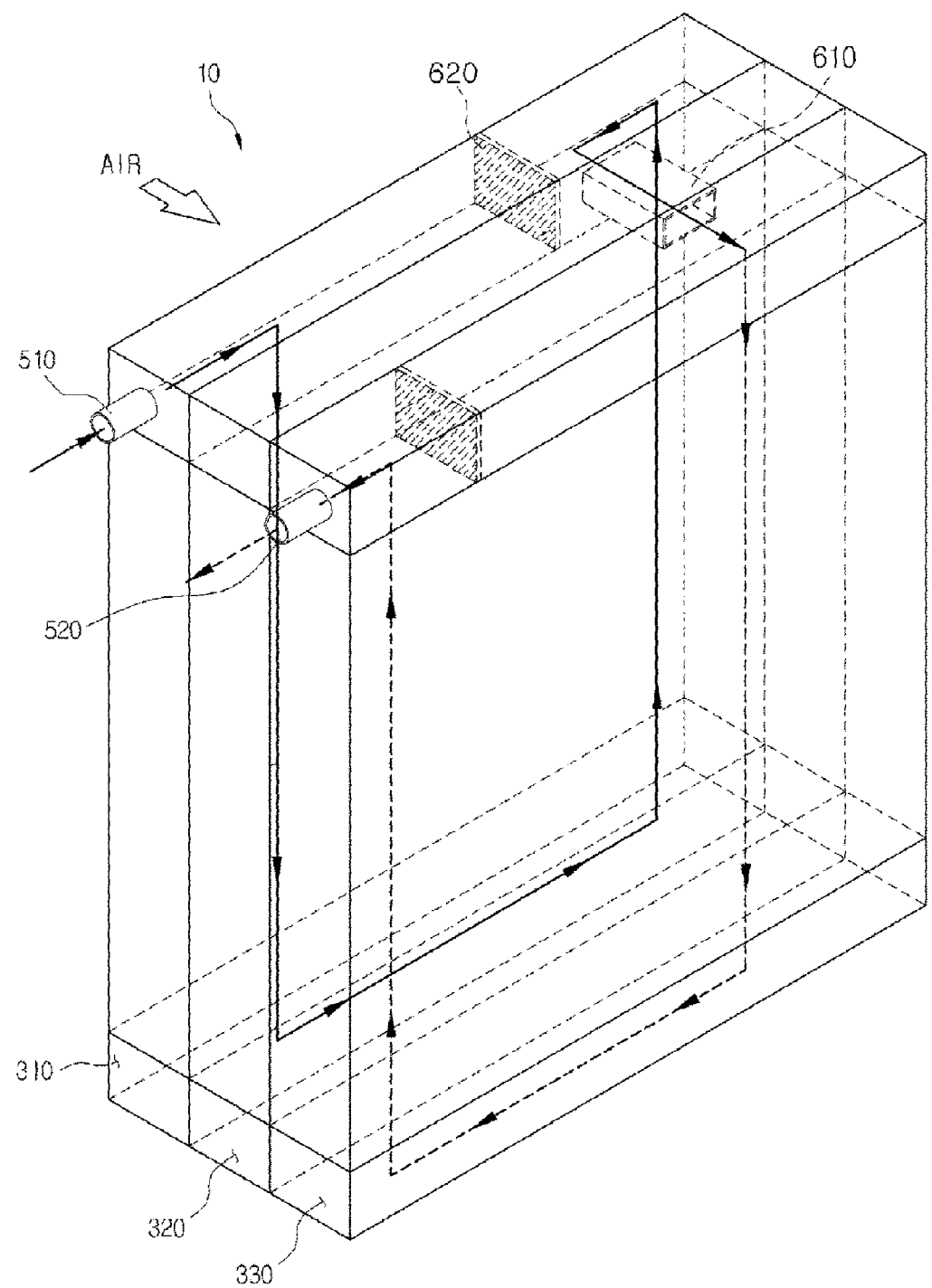

The flow of refrigerant in the cold-storage heat exchanger 10 of FIG. 11 will now be explained, showing another example of the path of circulation of refrigerant. Refrigerant is drawn into the cold-storage heat exchanger 10 through the inlet pipe 510 that communicates with the first space 310 of the first header tank 100. The drawn refrigerant moves downwards along the corresponding refrigerant tubes 410, passes through the first space 310 of the second header tank 200, moves upwards again, and then enters the third space 330 of the first header tank 100 via the refrigerant passing holes 340 that are formed in the first space 310 and the third space 330 of the first header tank 100.

Subsequently, the refrigerant moves downwards along the corresponding refrigerant tubes 430 that are fixed at the opposite ends thereof to the third spaces 330 of the first and second header tanks 100 and 200. Thereafter, the refrigerant flows along the third space 330 of the second header tank 200, moves upwards again, and then enters the third space 330 of the first header tank 100. Subsequently, the refrigerant is discharged out of the cold-storage heat exchanger 10 through the outlet pipe 520 that communicates with the third space 330 of the first header tank 100.

The flow of refrigerant in the cold-storage heat exchanger 10 of FIG. 12 will now be explained, showing a further example of the path of circulation of refrigerant. Refrigerant is drawn into the cold-storage heat exchanger 10 through the inlet pipe 510 that communicates with the first space 310 of the first header tank 100. The drawn refrigerant flows along the corresponding refrigerant tubes 410 in an up and down zigzag manner and then goes back to the first space 310 of the first header tank 100. Subsequently, the refrigerant flows into the third space 330 through the refrigerant passing holes 340 that are formed in the first space 310 and the third space 330 of the first header tank 100.

Thereafter, the refrigerant flows in an up and down zigzag manner along the corresponding refrigerant tubes 430 that are fixed at the opposite ends thereof to the third space 330, and then reaches again the third space 330 of the first header tank 100. The refrigerant is subsequently discharged out of the cold-storage heat exchanger 10 through the outlet pipe 520 that communicates with the third space 330 of the first header tank 100.

Figure 12:
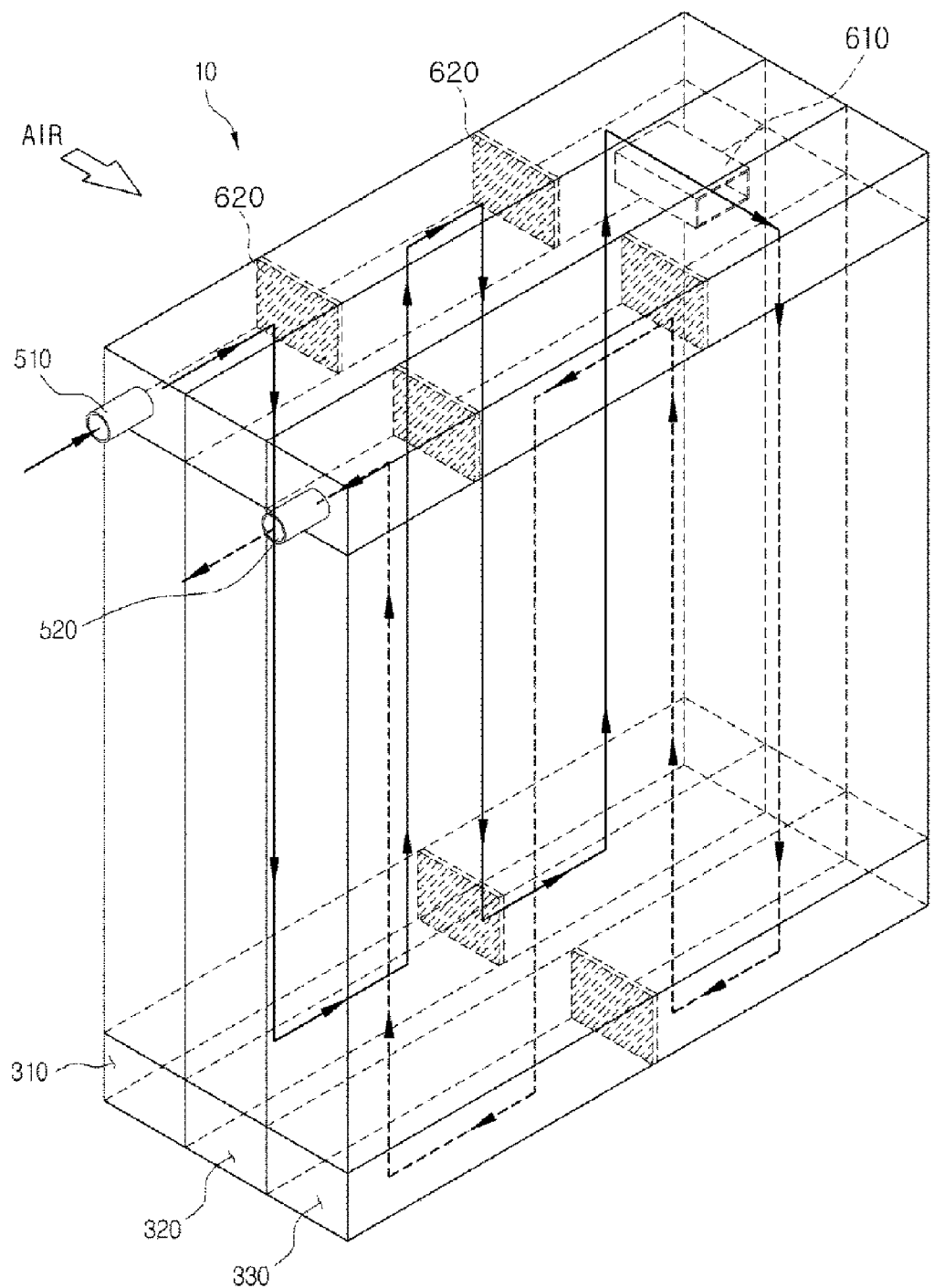
Figure 13:
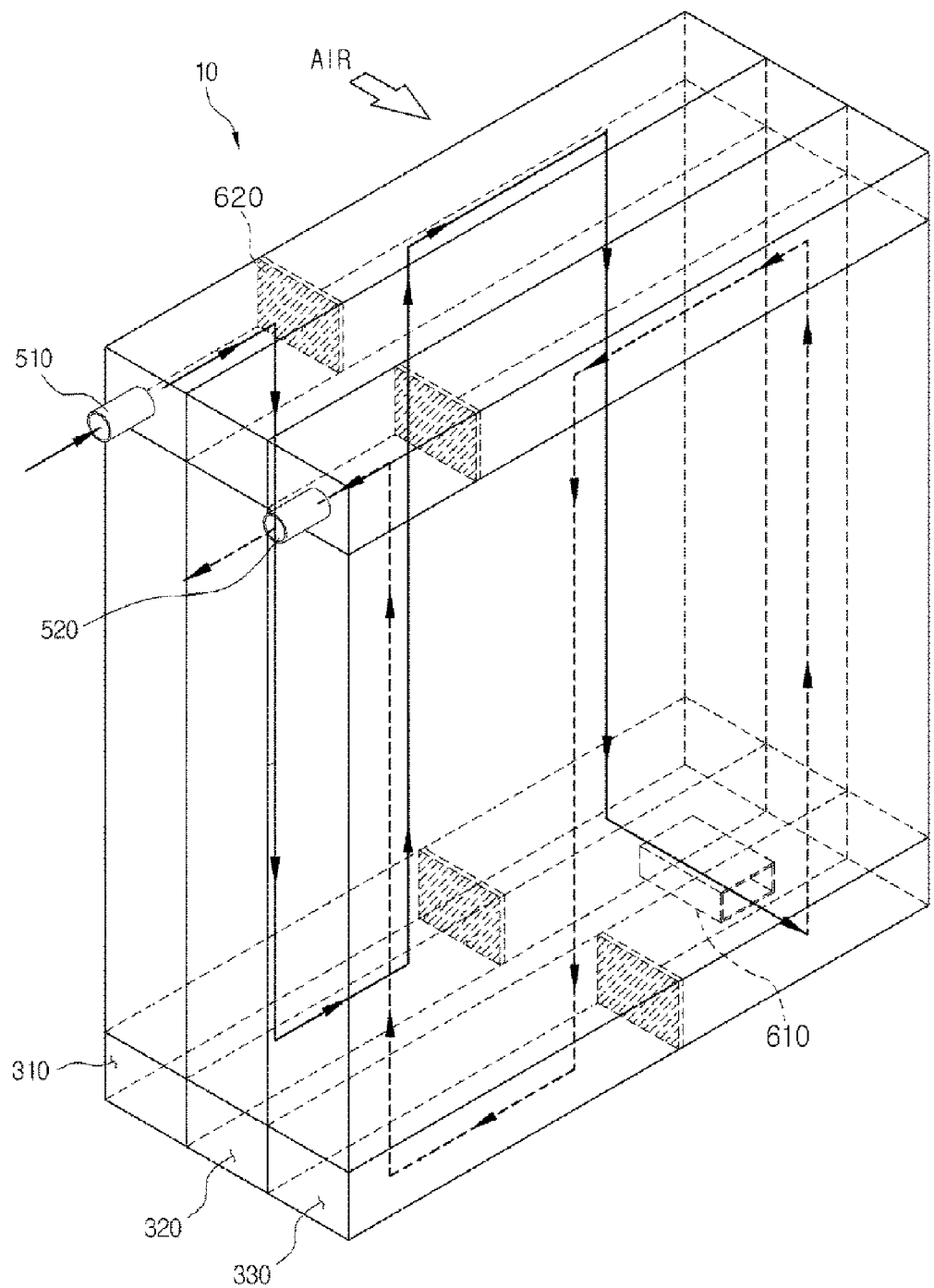

An example of the path of circulation of refrigerant, shown in FIG. 13, is similar to the example of FIG. 12, but in the example of FIG. 13, the refrigerant passing holes are formed in the first and third spaces 310 and 330 of the second header tank 200, unlike that of the example of FIG. 12.

Embodiment 4

Figure 15:
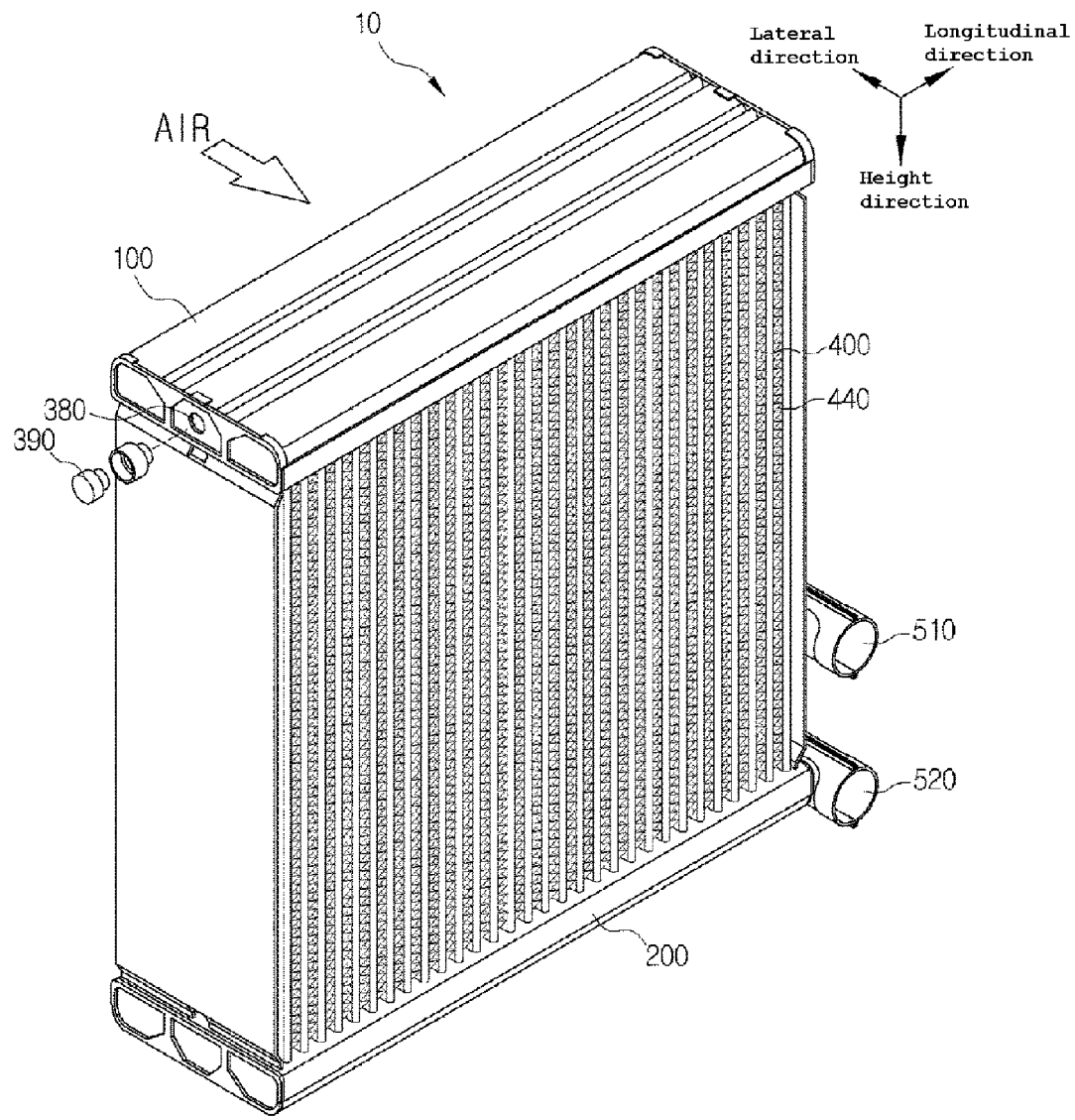
FIG. 15 is a perspective view illustrating a cold-storage heat exchanger, according to still another embodiment of the present invention.
Figure 16:
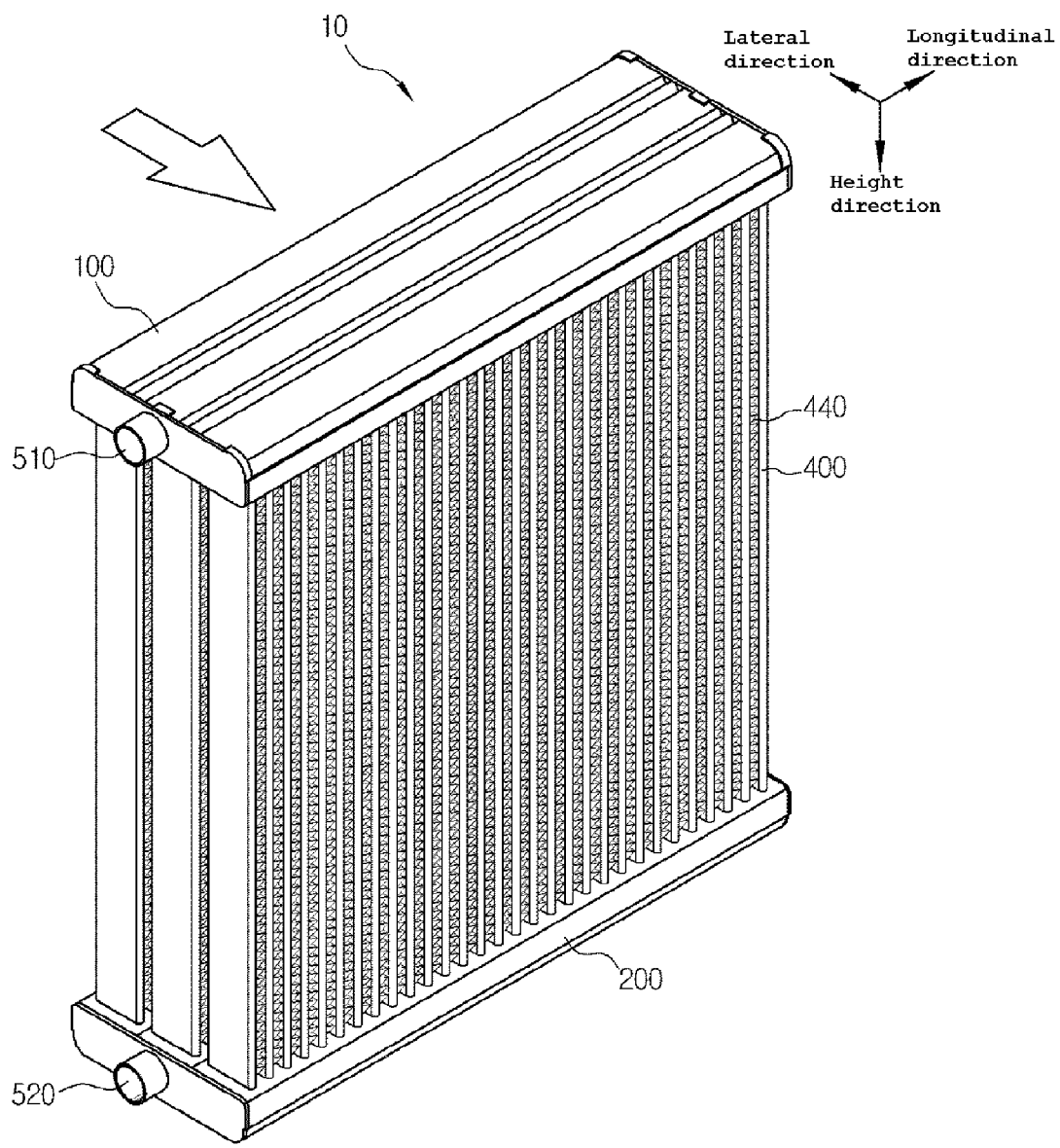
FIGS. 16 through 18 are respectively a perspective view, an exploded perspective view and a front view illustrating a cold-storage heat exchanger, according to still another embodiment of the present invention.
Figure 17:
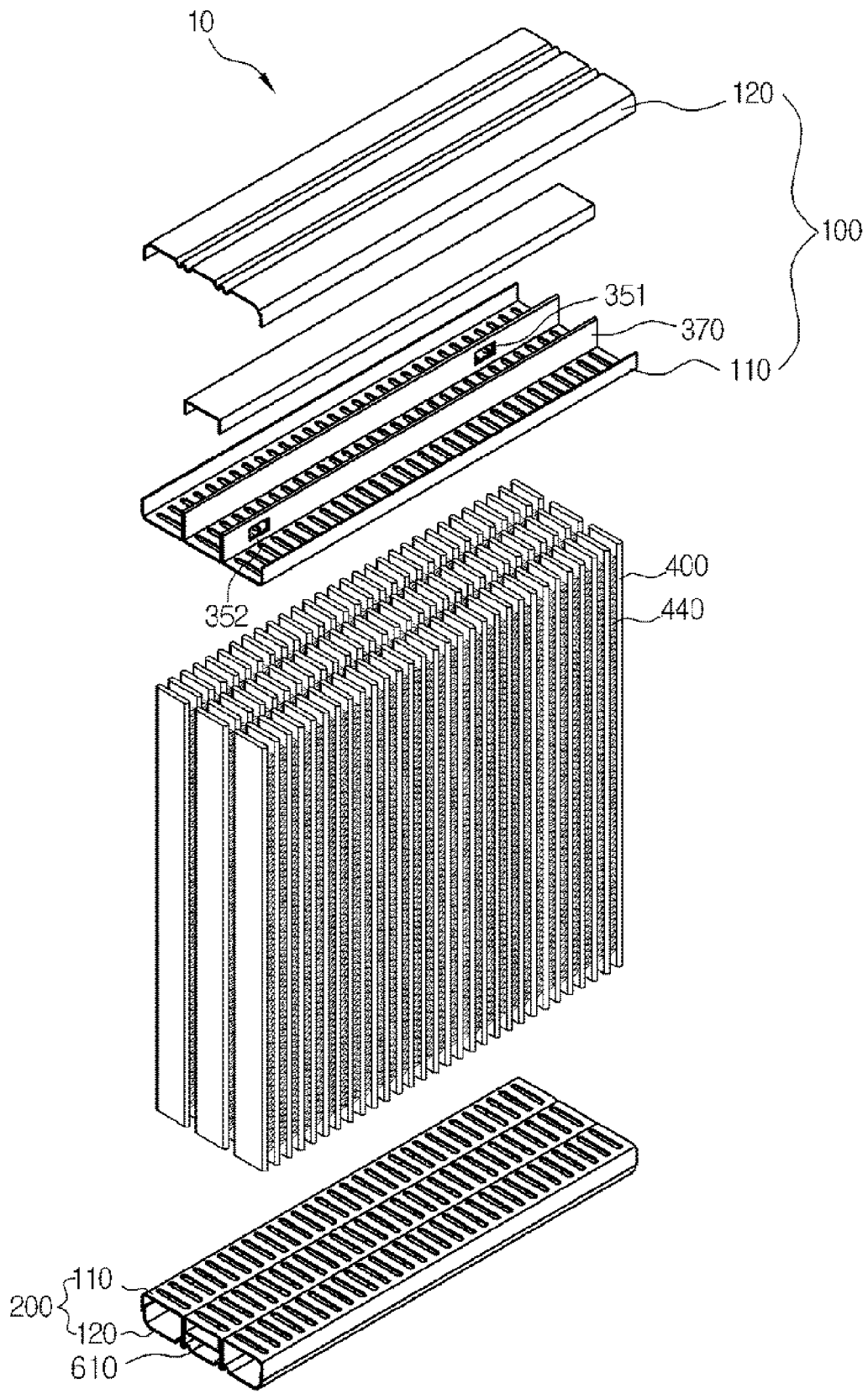
Figure 18:
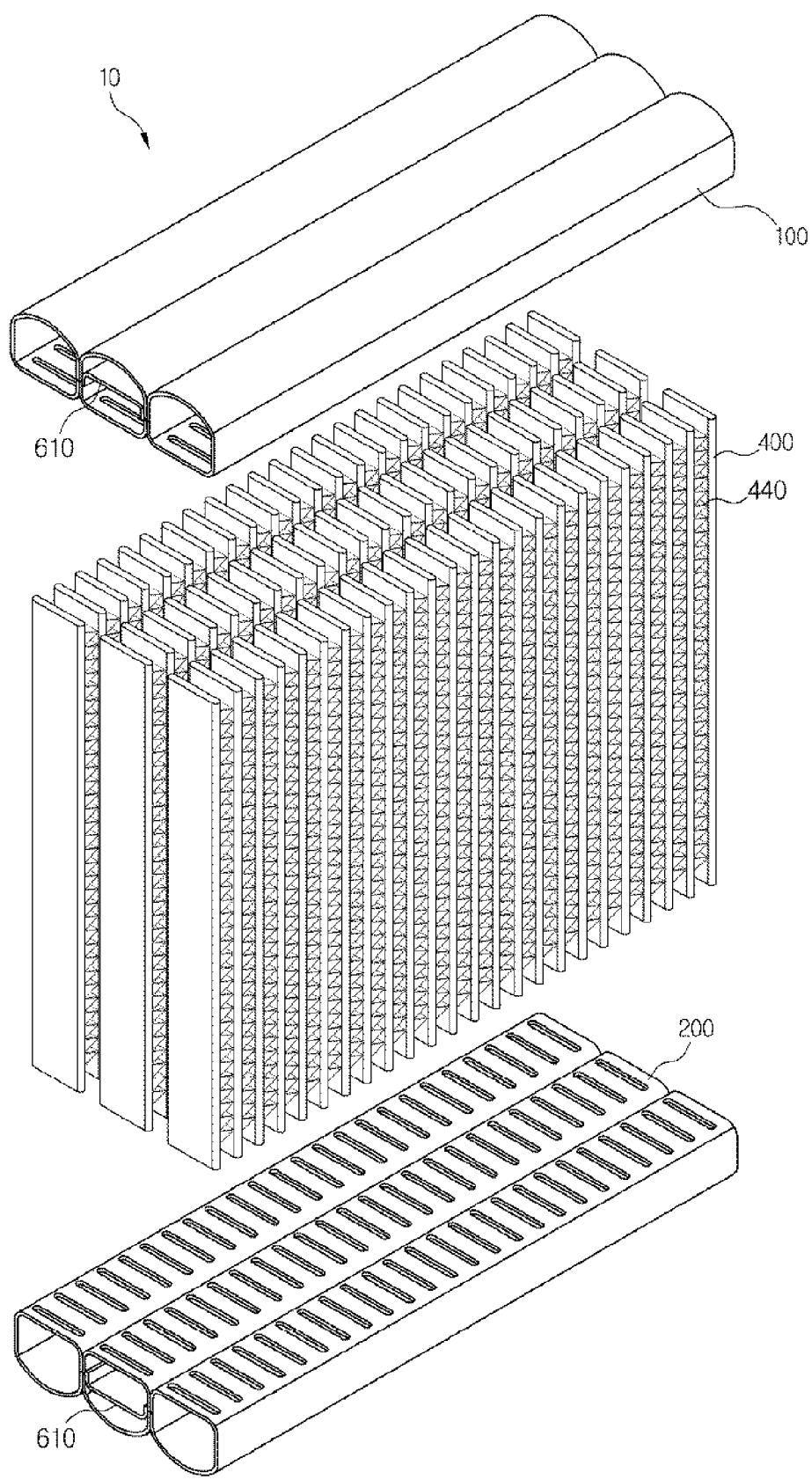
Figure 19:
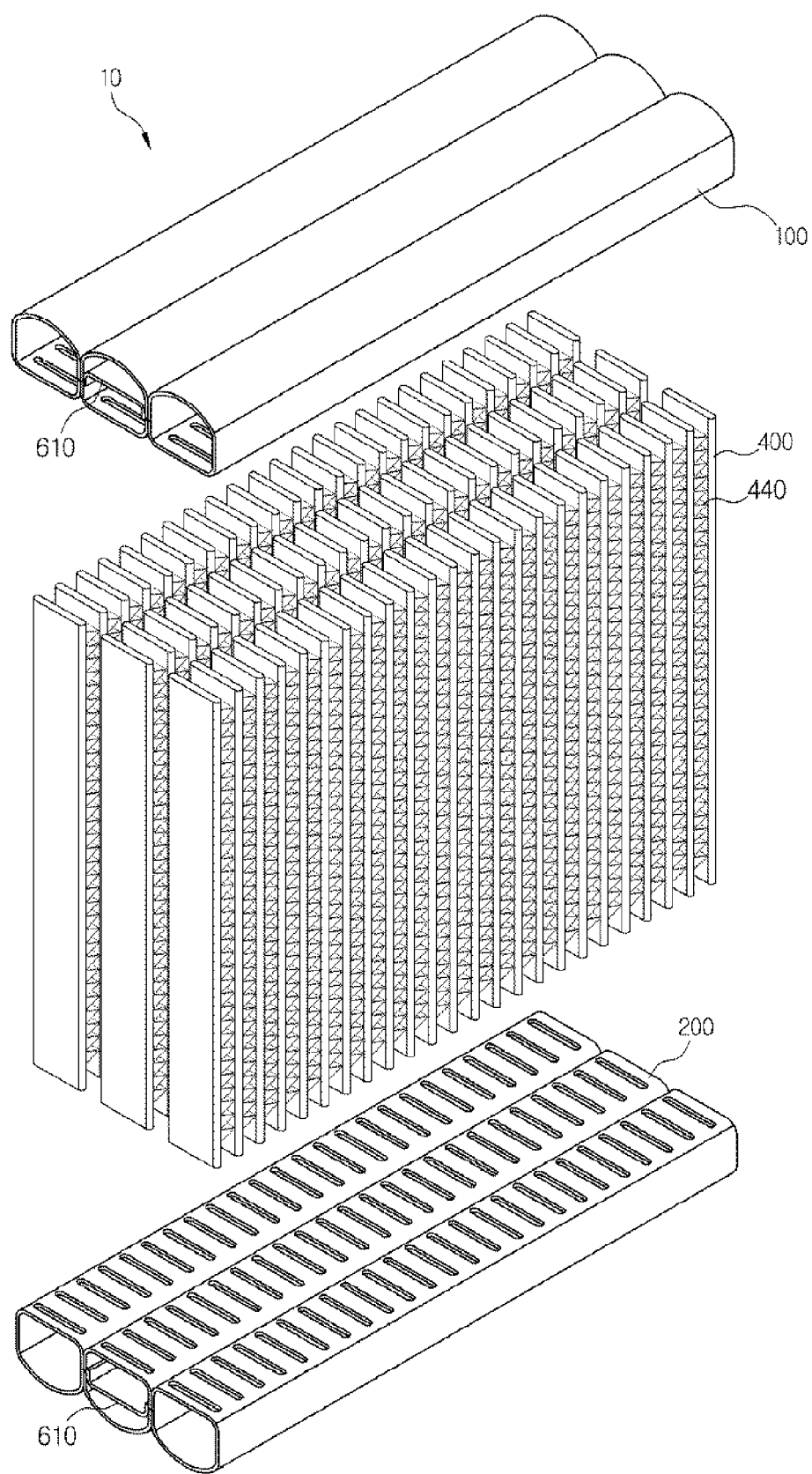
FIGS. 19 and 20 are respectively an exploded perspective view and a front view illustrating a cold-storage heat exchanger, according to still another embodiment of the present invention.
Figure 20:
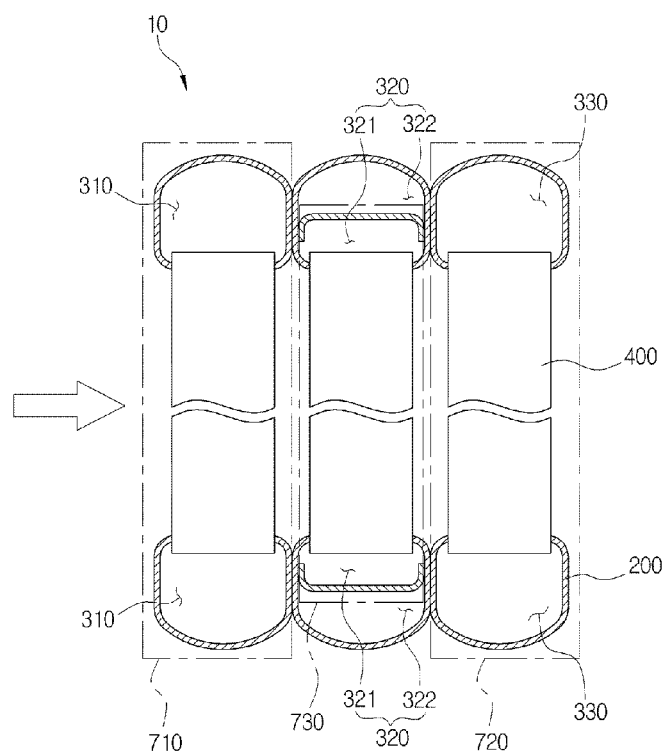

Referring to FIG. 15, in the cold-storage heat exchanger 10 according to the present invention, a cold-storage medium is stored in the cold-storage tube 420, wherein of the second spaces 320 of the first and second header tanks 100 and 200 to which the opposite ends of the cold-storage tubes 420 are fixed, a cold-storage-medium injection hole 380 is formed in the second space 320 other than the second space 320 that has the partitioning means 610 and the refrigerant passing hole 340 therein, so that the sold-storage medium is injected into the corresponding second space 320 through the cold-storage-medium injection hole 380.

The cold-storage-medium injection hole 380 is closed by a stopper 390. After the cold-storage medium has been injected into the second space 320, the cold-storage-medium injection hole 380 is sealed with the stopper 390. As necessary, after the injection, the cold-storage-medium injection hole 380 may be permanently sealed by means of welding or the like.

Embodiment 5

As shown in FIGS. 17 through 20, the cold-storage heat exchanger 10 according to this embodiment of the present invention includes a partitioning means 610 which comprises a planar member extending in the longitudinal direction and partitions each second space 320 into two portions with respect to the height direction. The cold-storage heat exchanger 10 includes a first heat exchange part 710 in which refrigerant circulates along the tubes 400 that communicate with the first spaces 310, a second heat exchange part 720 in which refrigerant circulates along the tubes 400 that communicate with the third spaces 330, and a cold-storage part 730 in which a cold-storage medium is stored in the tubes 400 that communicate with a primary-second space 321.

In the cold-storage heat exchanger 10 according to this embodiment, either an inlet pipe 510 or an outlet pipe 520 communicates with a secondary-second space 322 of one of the first and second header tanks 100 and 200, and the other one of the inlet pipe 510 and the outlet pipe 520 communicates with a secondary-second space 322 of the other one of the first and second header tanks 100 and 200. Hereinafter, the case will be described with reference to FIGS. 16 through 26, which assume that the header tank that is disposed at the upper position in the drawings is the first header tank 100, and the header tank that is disposed at the lower position in the drawings is the second header tank 200.

In this embodiment, refrigerant passing holes 340 comprise inflow branch holes 350 which are formed in the secondary-second space 322 that communicates with the inlet pipe 510, and outflow branch holes 360 which are formed in the secondary-second space 322 that communicates with the outlet pipe 520.

That is, the inflow branch holes 350 are formed in the partitions 370 of the secondary-second space 322 of the first header tank 100 so that the refrigerant that has been drawn into the secondary-second space 322 of the first header tank 100 through the inlet pipe 510 branches off into the first space 310 and the third space 330 through the inflow branch holes 350.

Furthermore, the outflow branch holes 360 are formed in the partitions 370 of the secondary-second space 322 of the second header tank 200 so that the refrigerant that has circulated through the first heat exchange part 710 and the second heat exchange part 720 flows from the first space 310 and the third space 330 into the secondary-second space 322 of the second header tank 200 through the outflow branch holes 360 before being discharged out of the cold-storage heat exchanger 10 through the outlet pipe 520.

The inflow branch holes 350 comprise a first inflow branch hole 351 which communicates with the first space 310 of the first header tank 100, and a second inflow branch hole 352 which communicates with the third space 330 of the first header tank 100. The outflow branch holes 360 comprise a first outflow branch hole 361 which communicates with the first space 310 of the second header tank 200, and a second outflow branch hole 362 which communicates with the third space 330 of the second header tank 200.

Figure 21:
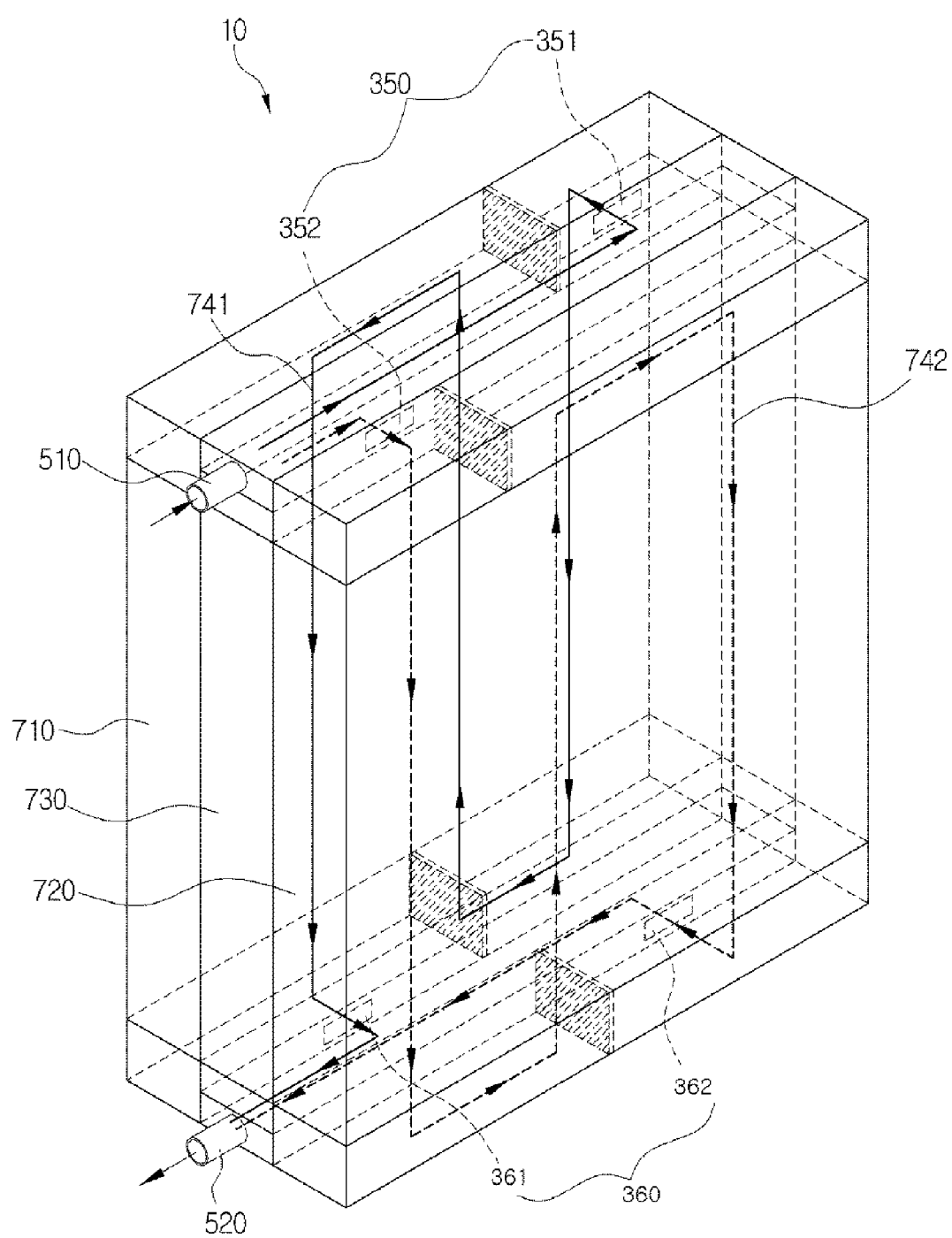
FIGS. 21 through 26 are views showing several embodiments of a path along which a heat exchanging medium circulates in the cold-storage heat exchanger of the present invention.

As shown in FIG. 21, in the cold-storage heat exchanger 10 according to this embodiment, a first flow path 741 along which the refrigerant circulates in the first heat exchange part 710 is independently formed from a second flow path 742 along which the refrigerant circulates in the second heat exchange part 720. The type of circulation path formed by each of the first flow path 741 and the second flow path 742 is the same type of path.

The flow of the refrigerant will now be explained with reference to FIG. 21.

The refrigerant flows into the cold-storage heat exchanger 10 through the inlet pipe 510 that communicates with the secondary-second space 322 of the first header tank 100. Some of the refrigerant that has drawn into the secondary-second space 322 flows into the second heat exchange part 720 through the second inflow branch hole 352, and the remaining refrigerant flows into the first heat exchange part 710 through the first inflow branch hole 351.

The refrigerant that has been drawn into the second heat exchange part 720 flows downwards along the corresponding tubes 400, enters the third space 330 of the second header tank 200, and then flows upwards again under the guidance of the baffle 620 that is provided in the third space 330.

Thereafter, the refrigerant enters the third space 330 of the first header tank 100, flows downwards again under the guidance of the baffle 620 that is provided in the third space 330 of the first header tank 100, and then reaches the third space 330 of the second header tank 200, thus completing the circulation in the second heat exchange part 720. Subsequently, the refrigerant flows into the secondary-second space 322 of the second header tank 200 through the second outflow branch hole 362.

The refrigerant that has been drawn into the first heat exchange part 710 also flows in an up and down zigzag manner similar to the path of circulation of the refrigerant that has been drawn into the second heat exchange part 720, and then enters the secondary-second space 322 of the second header tank 200 through the first outflow branch hole 361. Thereafter, the refrigerant, along with the refrigerant that has entered secondary-second space 322 of the second header tank 200 through the second outflow branch hole 362, is discharged out of the cold-storage heat exchanger 10 through the outlet pipe 520.

As such, in the cold-storage heat exchanger 10, the first flow path 741 and the second flow path 742 form independent circulation paths, thus enhancing the efficiency of heat exchange between the air and the refrigerant that circulates along the first flow path 741 and the second flow path 742. When it is in an idle stop/go state, the cold-storage part 730 discharges cold air that has been stored therein into the passenger compartment of the vehicle, thus preventing the temperature in the passenger compartment from rapidly increasing, thereby reducing the consumption of power to operate the compressor, and contributing to increasing the fuel efficiency.

Figure 23:
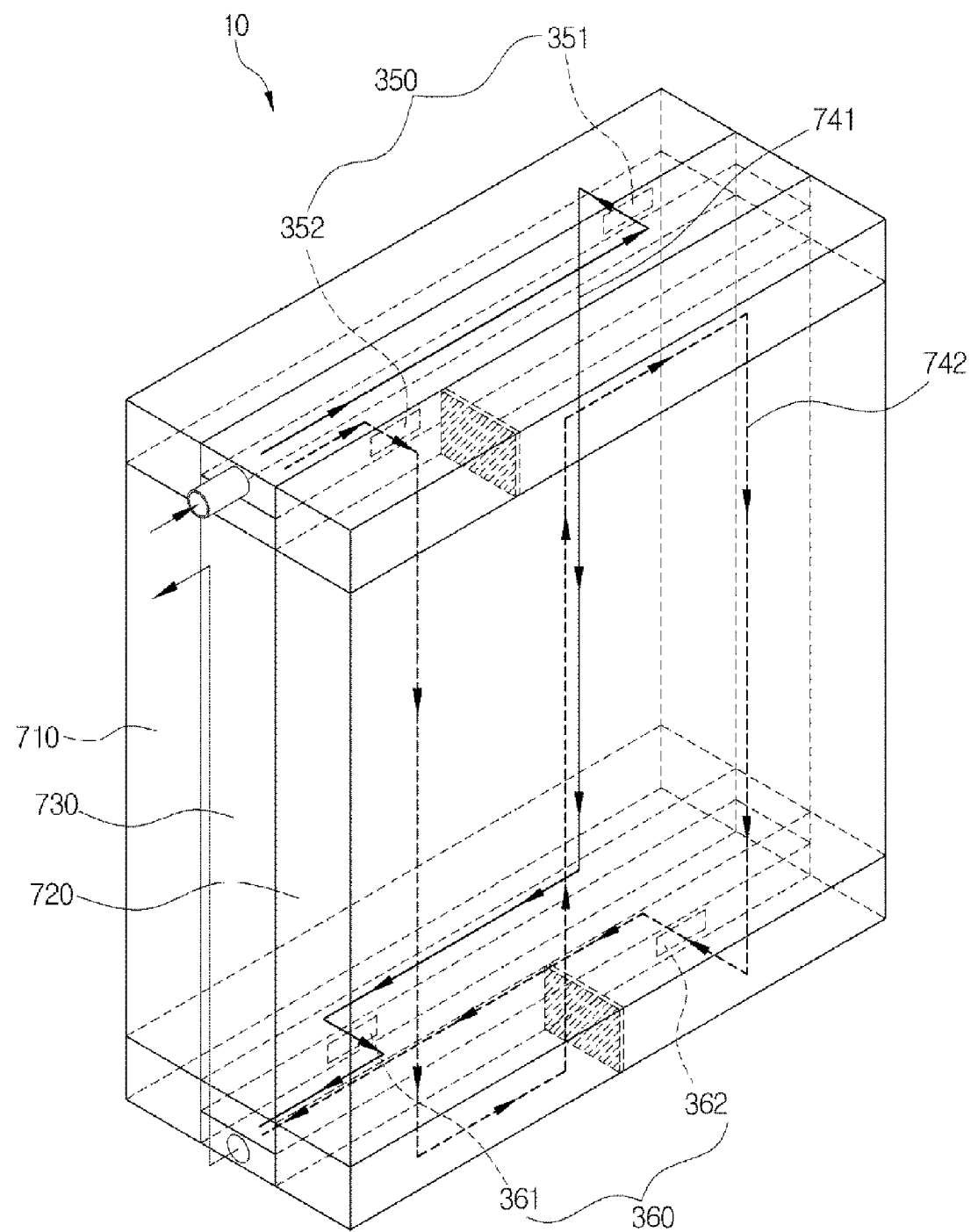

As shown in FIG. 23, the cold-storage heat exchanger 10 may be configured such that the first flow path 741 along which the refrigerant circulates in the first heat exchange part 710 is independently formed from the second flow path 742 along which the refrigerant circulates in the second heat exchange part 720, wherein the first flow path 741 and the second flow path 742 each form a different type of circulation path relative to the other.

The flow of the refrigerant will now be explained with reference to FIG. 23.

The refrigerant flows into the cold-storage heat exchanger 10 through the inlet pipe 510 that communicates with the secondary-second space 322 of the first header tank 100. Some of the refrigerant that has been drawn into the secondary-second space 322 flows into the second heat exchange part 720 through the second inflow branch hole 352, and the remaining refrigerant flows into the first heat exchange part 710 through the first inflow branch hole 351.

The refrigerant that has been drawn into the second heat exchange part 720 flows downwards along the corresponding tubes 400, enters the third space 330 of the second header tank 200, and then flows upwards again under the guidance of the baffle 620 that is provided in the third space 330.

Thereafter, the refrigerant enters the third space 330 of the first header tank 100, flows downwards again under the guidance of the baffle 620 that is provided in the third space 330 of the first header tank 100, and then reaches the third space 330 of the second header tank 200, thus completing the circulation in the second heat exchange part 720. Subsequently, the refrigerant flows into the secondary-second space 322 of the second header tank 200 through the second outflow branch hole 362.

Meanwhile, the refrigerant that has entered the first heat exchange part 710 flows downwards, enters the first space 310 of the second header tank 200, and flows into the secondary-second space 322 of the second header tank 200 through the first outflow branch hole 361. Thereafter, the refrigerant, along with the refrigerant that has entered the secondary-second space 322 of the second header tank 200 through the second outflow branch hole 362, is discharged out of the cold-storage heat exchanger 10 through the outlet pipe 520.

In this case, the first flow path 741 and the second flow path 742 form independent circulation paths along which the refrigerant circulates while heat exchange takes place between it and the air, whereas the first flow path 741 and the second flow path 742 form different types of circulation paths, so that cold energy of the cold-storage part 730 can be effectively transferred to the refrigerant. Furthermore, the independent circulation paths are configured such that they intersect each other so that the overall temperature distribution can be made uniform.

Figure 24:
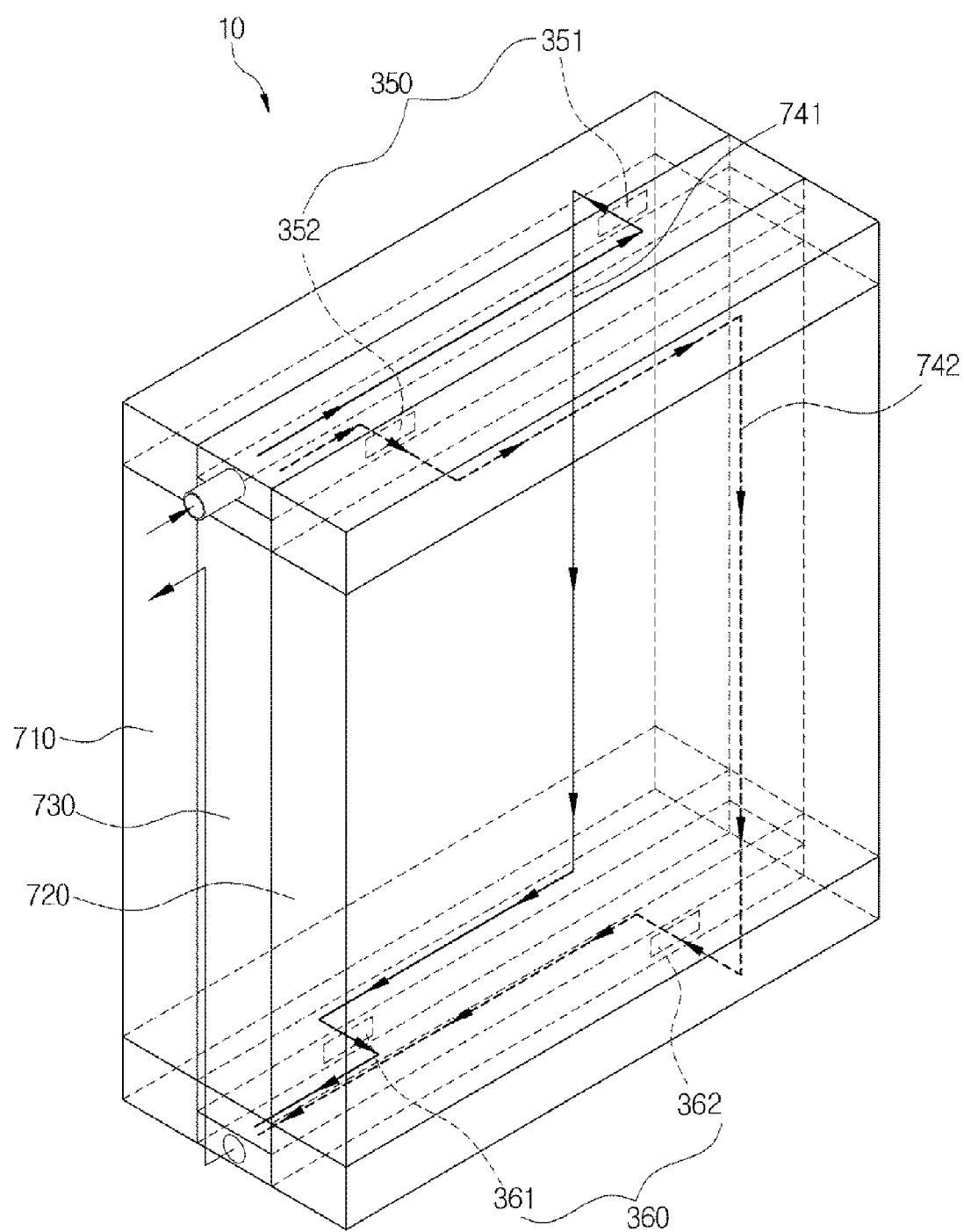

As shown in FIG. 24, the cold-storage heat exchanger 10 may be configured such that each of the first flow path 741 and the second flow path 742 forms a single path style rather than forming a zigzag type path so that the pressure of working fluid can be prevented from being reduced, and such that the first and second flow paths 741 and 742 that are the independent circulation paths intersect each other to make the overall temperature distribution uniform.

Figure 25:
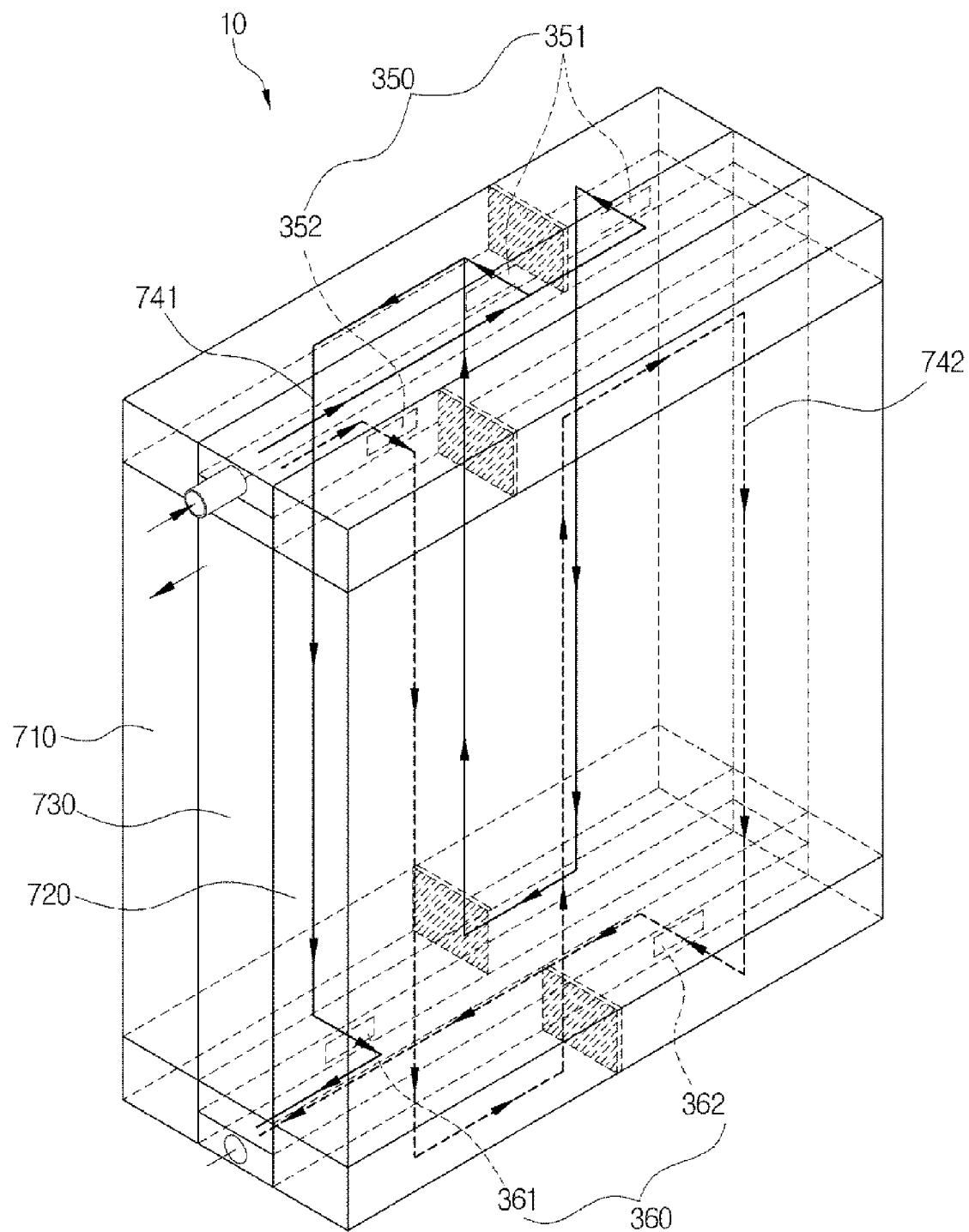
Figure 26:
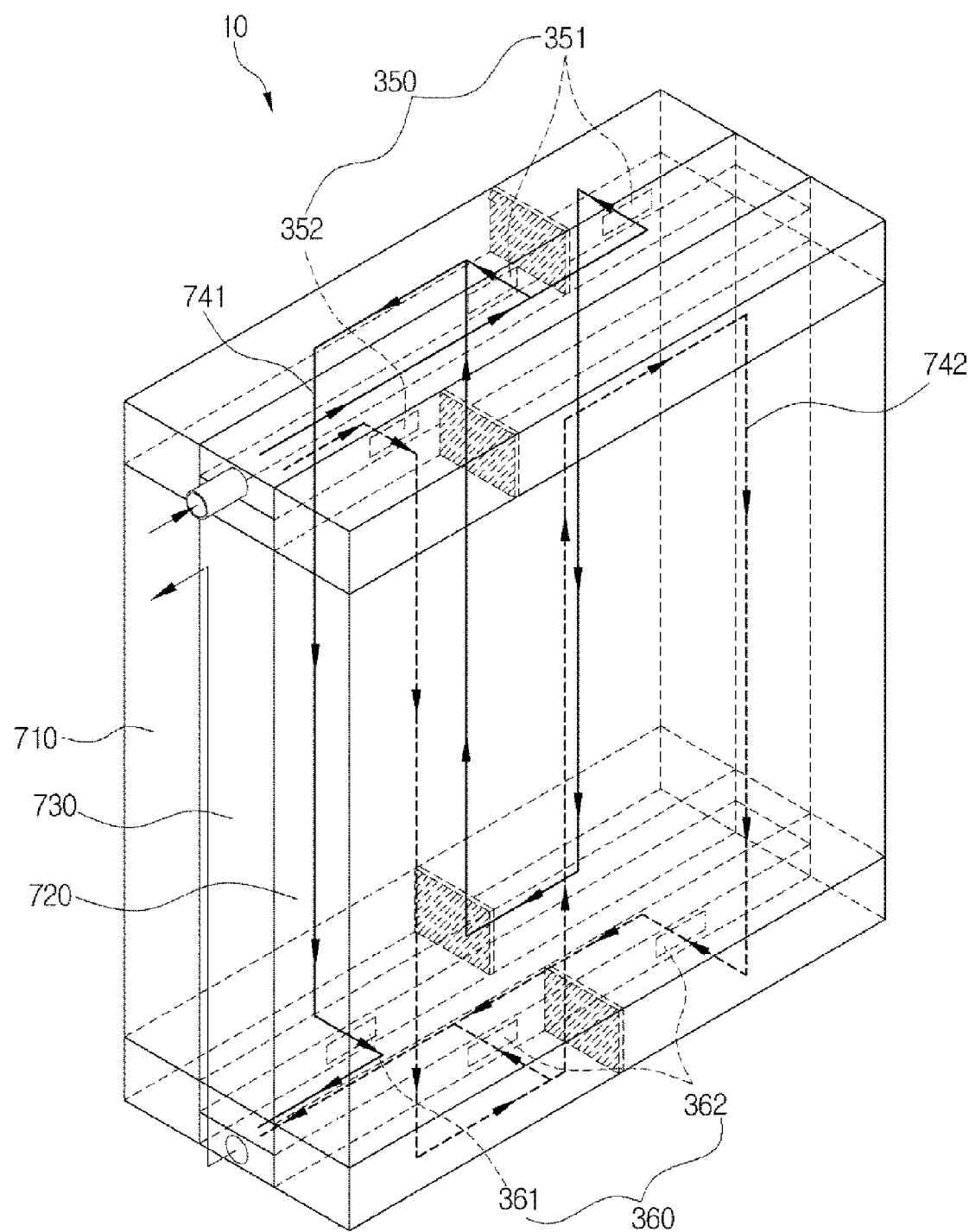

Furthermore, the cold-storage heat exchanger 10 may be configured such that each of the first inflow branch hole 351, the second inflow branch hole 352, the first outflow branch hole 361 and the second outflow branch hole 362 comprises at least one or more, that is, a plurality of holes, so that the flow paths of the refrigerant are formed as shown in FIGS. 25 and 26.

The flow of the refrigerant in the cold-storage heat exchanger 10 of FIG. 25 will now be explained.

The refrigerant flows into the cold-storage heat exchanger 10 through the inlet pipe 510 that communicates with the secondary-second space 322 of the first header tank 100. Some of the refrigerant that has been drawn into the secondary-second space 322 flows into the second heat exchange part 720 through the second inflow branch hole 352, and the remaining refrigerant flows into the first heat exchange part 710 through the first inflow branch holes 351.

In this case, the two first inflow branch holes 351 are formed in the secondary-second space 322 of the first header tank 100 at positions spaced apart from each other by a predetermined distance in the longitudinal direction so that the refrigerant can be distributed into two portions of the first heat exchange part 710.

Some of the refrigerant that has entered the first heat exchange part 710 through the corresponding one of the first inflow branch holes 351 flows downwards along the corresponding tubes 400, enters the first space 310 of the second header tank 200, and then flows upwards again under the guidance of a baffle 620 that is provided in the first space 310 of the second header tank 200.

Thereafter, the refrigerant that has reached the first space 310 of the first header tank 100 is mixed with the remaining refrigerant that has entered the first heat exchange part 710 through the other first inflow branch hole 351, and the mixed refrigerant flows downwards again under the guidance of a baffle 620 that is provided in the first space 310 of the first header tank 100 and reaches the first space 310 of the second header tank 200, thus completing the circulation in the first heat exchange part 710. Subsequently, the refrigerant enters the secondary-second space 322 of the second header tank 200 through the first outflow branch hole 361.

The refrigerant that has entered the second heat exchange part 720 also flows in an up and down zigzag manner similar to the path of circulation of the refrigerant that has entered the first heat exchange part 710, and then enters the secondary-second space 322 of the second header tank 200 through the second outflow branch hole 362. Subsequently, the refrigerant, along with the refrigerant that has entered the secondary-second space 322 of the second header tank 200 through the first outflow branch hole 361, is discharged out of the cold-storage heat exchanger 10 through the outlet pipe 520.

As shown in FIG. 26, the second outflow branch hole 362 may comprise two second outflow branch holes 362 which are formed in the secondary-second space 322 of the second header tank 200 at positions spaced apart from each other by a predetermined in the longitudinal direction. In this case, the refrigerant that flows through the third space 330 of the second header tank 200 branches off into two streams along the two second outflow branch holes 362 and enters the secondary-second space 322 before being discharged out of the cold-storage heat exchanger 10 through the outlet pipe 520.

Embodiment 6

Figure 22:
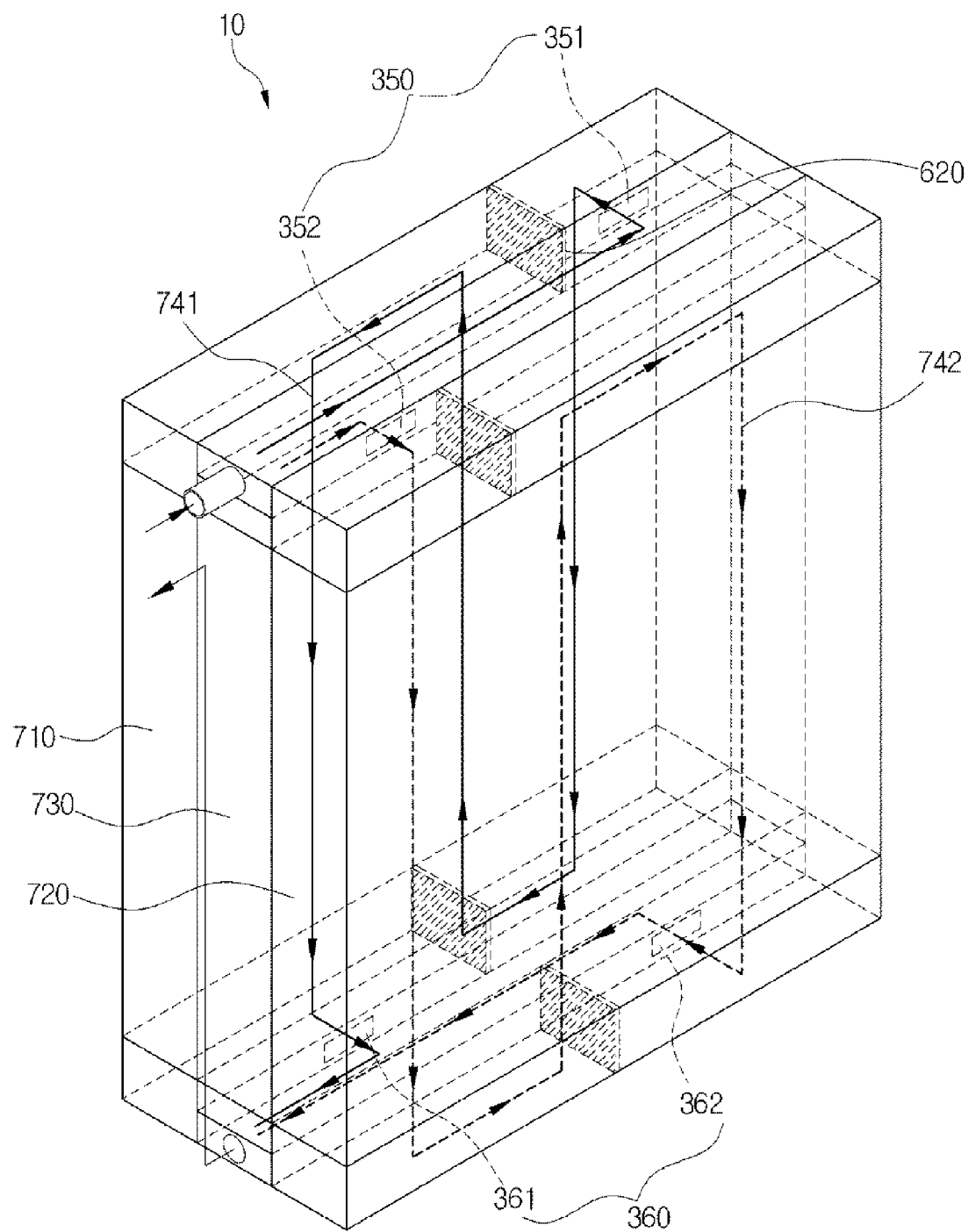

The cold-storage heat exchanger 10 according to this embodiment has the same first flow path 741 and second flow path 742 as those of FIG. 21 of the fifth embodiment, whereas as shown in FIG. 22, in the six embodiment, the outlet pipe 520 is disposed at a position adjacent to the inlet pipe 510 outside the cold-storage heat exchanger 10. In this case, the pipe layout and packaging of an HVAC (Heating, Ventilation and Air Conditioning) system can be facilitated so that the space in the vehicle can be effectively utilized.

Figure 28:
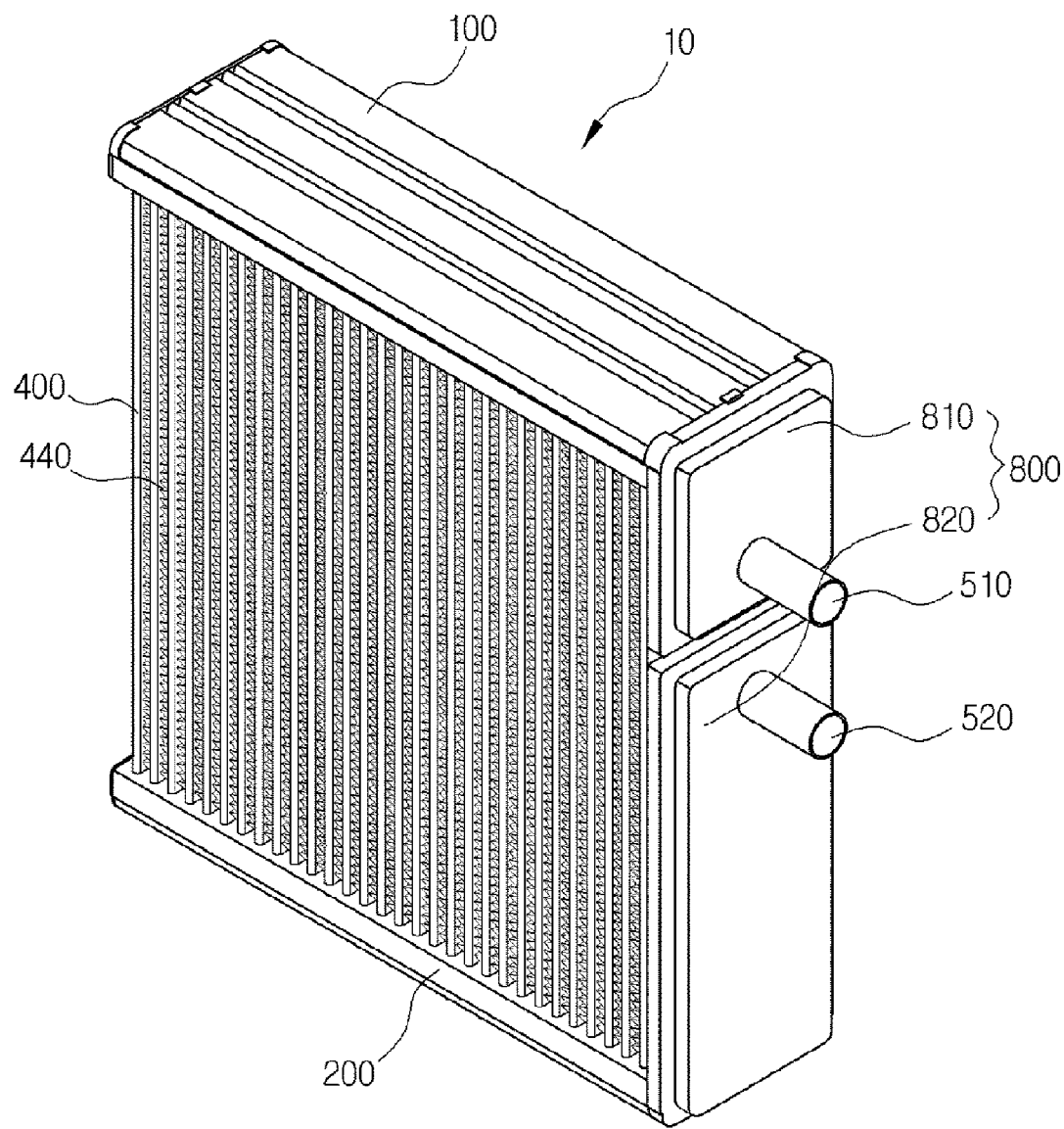
FIG. 28 is a perspective view illustrating a cold-storage heat exchanger, according to still another embodiment of the present invention.

To achieve the above purpose, as shown in FIG. 28, the cold-storage heat exchanger 10 may further include a pipe connector 800 which is provided on the outer surface of the cold-storage heat exchanger 10 at one side with respect to the longitudinal direction and comprises a first pipe connector 810 and a second pipe connector 820. The first pipe connector 810 communicates with either the first header tank 100 or the second header tank 200, so the refrigerant flows through the first pipe connector 810. The inlet pipe 100 is provided on the first pipe connector 810. The second pipe connector 820 communicates with the other one of the first header tank 100 and the second header tank 200, so the refrigerant flows through the second pipe connector 820. The outlet pipe 520 is provided on the second pipe connector 820.

In the cold-storage heat exchanger 10 of this case, the first pipe connector 810 and the second pipe connector 820 are configured such that the inlet pipe 510 and the outlet pipe 520 are disposed adjacent to each other and are parallel to each other.

Further, the pipe connector 800 communicates only with the secondary-second space 322 but not with the primary-second space 321 so that the refrigerant can be isolated from the cold-storage medium.

Each the first and second pipe connectors 810 and 820 of the pipe connector 800 may be configured such that the shape thereof is that of a tank which defines space therein or, alternatively, it is formed by coupling a separate plate to the exchanger.

Embodiment 7

Figure 27:
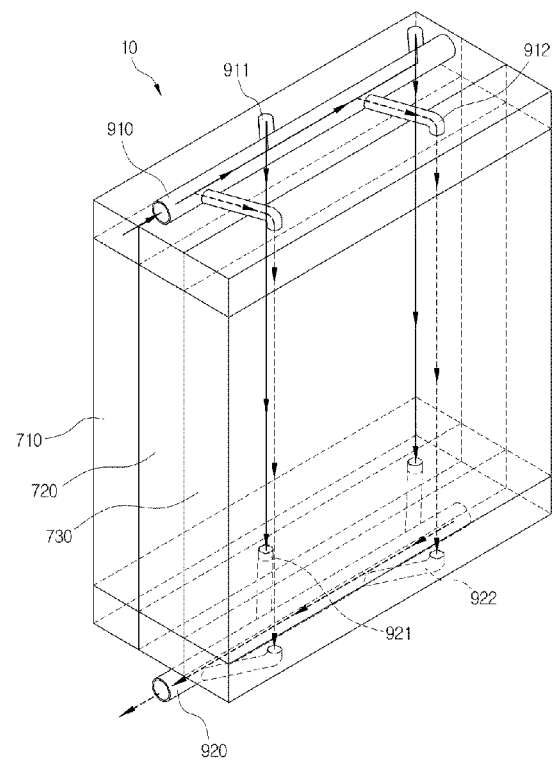
FIG. 27 is a perspective view illustrating a cold-storage heat exchanger, according to still another embodiment of the present invention.

As shown in FIG. 27, in the cold-storage heat exchanger 10 according to this embodiment, a first pipe 910 is provided on the upper surface of the first header tank 100 and extends in the longitudinal direction of the first header tank 100. Furthermore, at least one primary-first branch pipe 911 and at least one secondary-first branch pipe 912 branch off from the first pipe 910 and communicate with the first space 310 and the space 330, respectively.

The first pipe 910 is connected to the inlet pipe 510 so that the refrigerant is drawn into the first pipe 910 through the inlet pipe 510. The drawn refrigerant branches off into two streams, one entering the first space 310 through the primary-first branch pipe 911, and the other entering the third space 330 through the secondary-first branch pipe 912.

Preferably, a plurality of primary-first branch pipes 911 and a plurality of secondary-first branch pipes 912 are provided.

In the same manner, a second pipe 920 is provided under the lower surface of the second header tank 200 and extends in the longitudinal direction of the second header tank 200. Furthermore, at least one primary-second branch pipe 921 and at least one secondary-second branch pipe 922 branch off from the second pipe 920 and communicate with the first space 310 and the space 330 of the second header tank 200, respectively.

The second pipe 920 is connected to the outlet pipe 520. Thus, the refrigerant that has passed through the first heat exchange part 710 and reached the first space 310 of the second header tank 200 is discharged into the second pipe 920 through the primary-second branch pipe 921.

In addition, the refrigerant that has passed through the second heat exchange part 720 and reached the first space 310 of the second header tank 200 is discharged into the second pipe 920 through the secondary-second branch pipe 922. Eventually, the refrigerant that has passed through the secondary-second branch pipe 922 mixes with the refrigerant that has passed through the primary-second branch pipe 921, and then the mixed refrigerant is discharged out of the cold-storage heat exchanger 10 through the outlet pipe 520.

Embodiment 8

As shown in FIGS. 30 through 39, in the cold-storage heat exchanger according to this embodiment of the present invention, the inlet pipe 510 and the outlet pipe 520 are respectively connected to the first space 310 and the third space 330.

Particularly, the cold-storage heat exchanger 10 according to this embodiment includes a partitioning means 610 which is provided in either the first header tank 100 or the second header tank 200 and partitions each of the first space 310, the second space 320 and the third space 330 with respect to the longitudinal direction to define a separate partitioned section in each space 310, 320, 330. Furthermore, a refrigerant passing hole 340 is formed in a predetermined portion of each of laterally-opposite sidewalls of the separate partitioned section of the second space 320 so that the first space 310 can communicate with the third space 330 so that the refrigerant can flow between the first and third spaces 310 and 330.

Furthermore, in this cold-storage heat exchanger 10, refrigerant flows through the first and third rows of refrigerant tubes 410 and 430 which are respectively disposed at the front and rear rows with respect to the direction of the flow of air. A cold-storage medium is stored in the second row of tubes 420 which is disposed between the first and third rows of tubes 410 and 430, wherein refrigerant flows through all the first, second and third rows of tubes 400 that are disposed at positions corresponding to the separate partitioned sections of the first, second and third spaces 310, 320 and 330 that are defined by the partitioning means 610 and have the refrigerant passing holes 340 therein.

Thereby, refrigerant can flow from the first row of refrigerant tubes 410 to the third row of refrigerant tubes 410 through the refrigerant passing holes 340 that are disposed in the separate partitioned sections defined by the partitioning means 610. During this refrigerant flow process, the refrigerant can be prevented from mixing with the cold-medium medium that is stored in the second row of tubes 420.

In this embodiment, if there is one line of tubes 400 in the separate partitioned sections of the first, second and third spaces 310, 320 and 330 that are defined by the partitioning means 610 and have the refrigerant passing holes 340 therein, it is difficult to form the partition structure. If 25% of the total lines of tubes 400 or more are in the separate partitioned sections, the size of the space that can store the cold-storage medium is excessively reduced, deteriorating the cold-storage performance. Therefore, it is preferable for the position of the partitioning means 610 to be determined such that the number of lines of tubes 400 disposed at positions corresponding to the separate partitioned sections is at least one and is 25% or less of the total lines of tubes 400.

Figure 33:
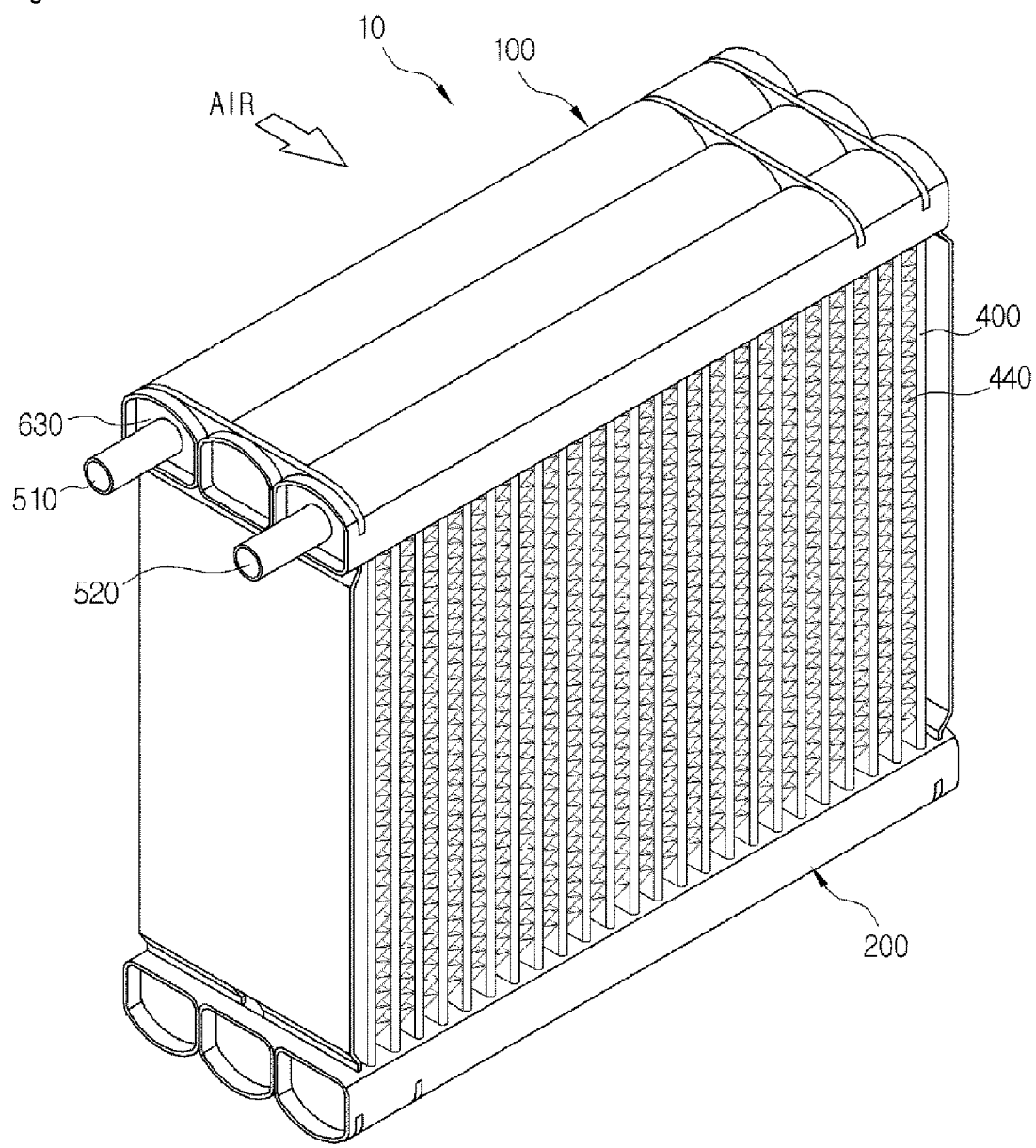
FIGS. 33 and 34 are respectively an exploded perspective view and a front view illustrating a cold-storage heat exchanger, according to still another embodiment of the present invention.
Figure 34:
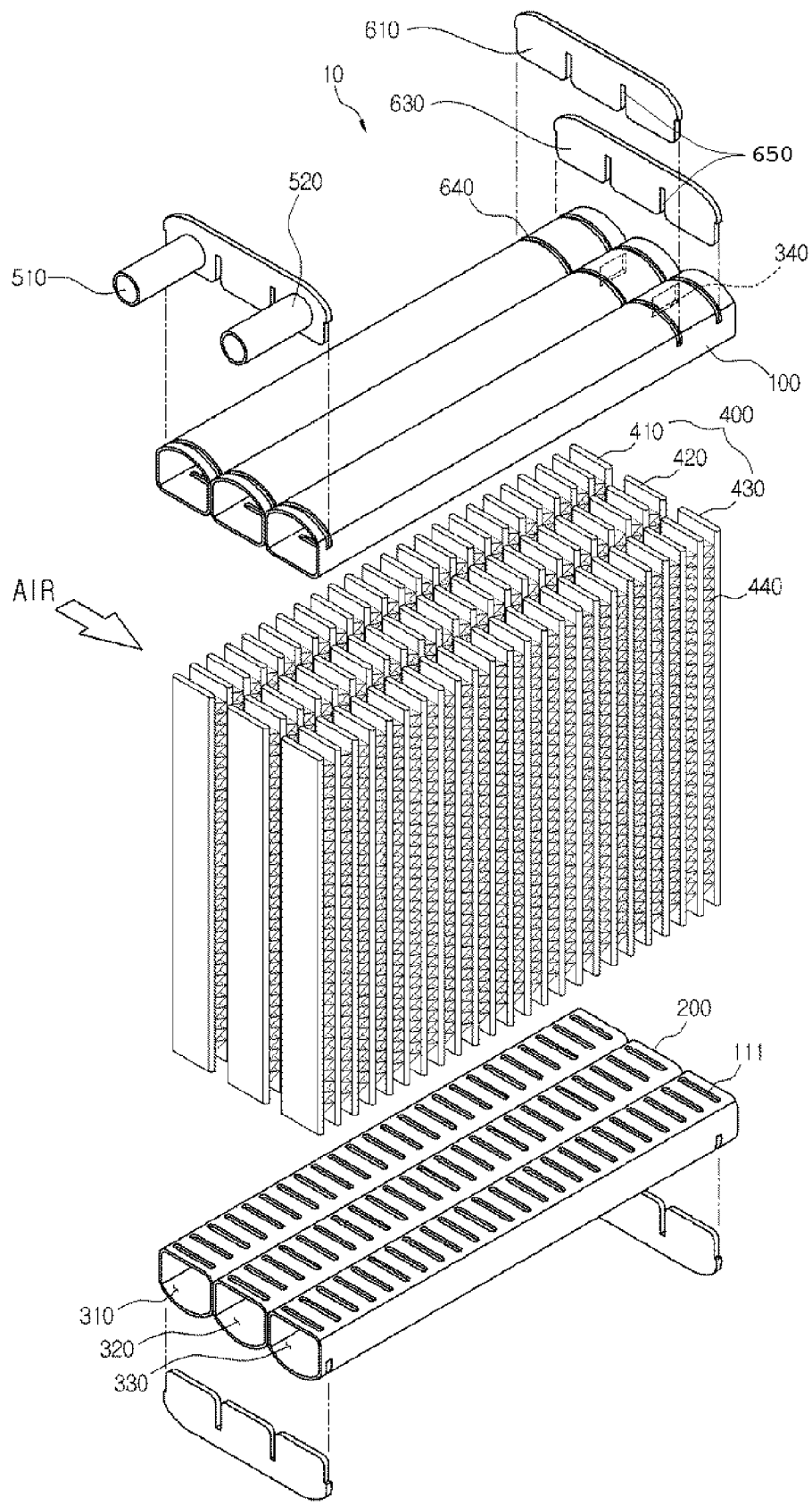
Figure 35:
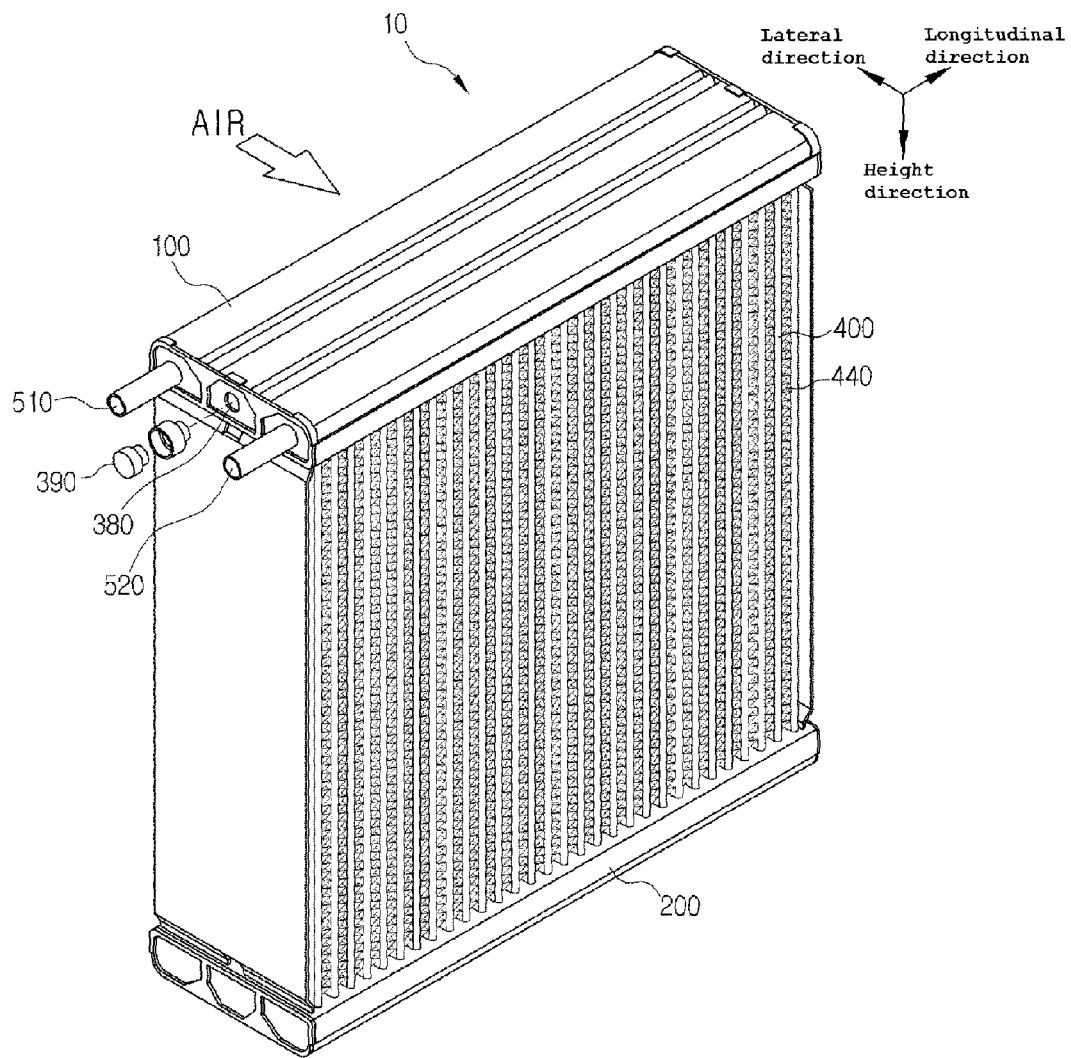
FIG. 35 is an exploded perspective view illustrating a cold-storage heat exchanger, according to still another embodiment of the present invention.

As shown in FIGS. 33 and 34, the cold-storage heat exchanger 10 according to this embodiment may be configured such that an opening 130 is formed in each of the opposite ends of the first and second header tanks 100 and 200, and a sealing baffle 630 is provided at a position adjacent to each opening 130 to seal the opening 130, and a partitioning means 610 has the same shape as that of the sealing baffle 630.

In this case, insert slots 640 are formed in predetermined portions of the outer surfaces of the first header tank 100 and the second header tank 200 so that each of the sealing baffles 630 and the partitioning means 610 can be inserted into the first header tank 100 or the second header tank 200 through the corresponding insert slot 640. After the sealing baffles 630 and partitioning means 610 have been inserted into and installed in the first and second header tanks 100 and 200, they are for example brazed to the corresponding portions of the first and second header tanks 100 and 200.

Preferably, the sealing baffles 630 and the partitioning means 610 have the same shape, and each of them has coupling slots 650 which are fitted over the outer sidewalls of the assemblies of the headers 110 and the tank cover plates 120 that define the first, second and third space 310, 320 and 330, in other words, which are fitted over the junction surfaces between the assemblies that are arranged in three rows.

Of course, in the case where the headers 110 and the tank cover plates 120 are integrally formed and the partitions 370 separate the first, second and third spaces 310, 320 and 330 from each other, coupling slots 650 may be depressed in each of the sealing baffles 630 and the partitioning means 610 to the depths corresponding to the heights of the corresponding partitions 370 so that the sealing baffles 630 and the partitioning means 610 can be fitted over the partitions 370 through the coupling slots 650.

Furthermore, in the case where the headers 110 and the tank cover plates 120 are integrally formed and the partitions 370 separate the first, second and third spaces 310, 320 and 330 from each other, the first header tank 100 and/or the second header tank 200 may be formed in such a way that the sealing baffles 630 and the partitioning means 610 are disposed in and fixed to the header 100 or the tank cover plate 120 before the header 100 and the tank cover plate 120 are assembled with each other, without the insert slots 640 being separately formed in the outer surface of the head tank 100, 200.

Figure 30:
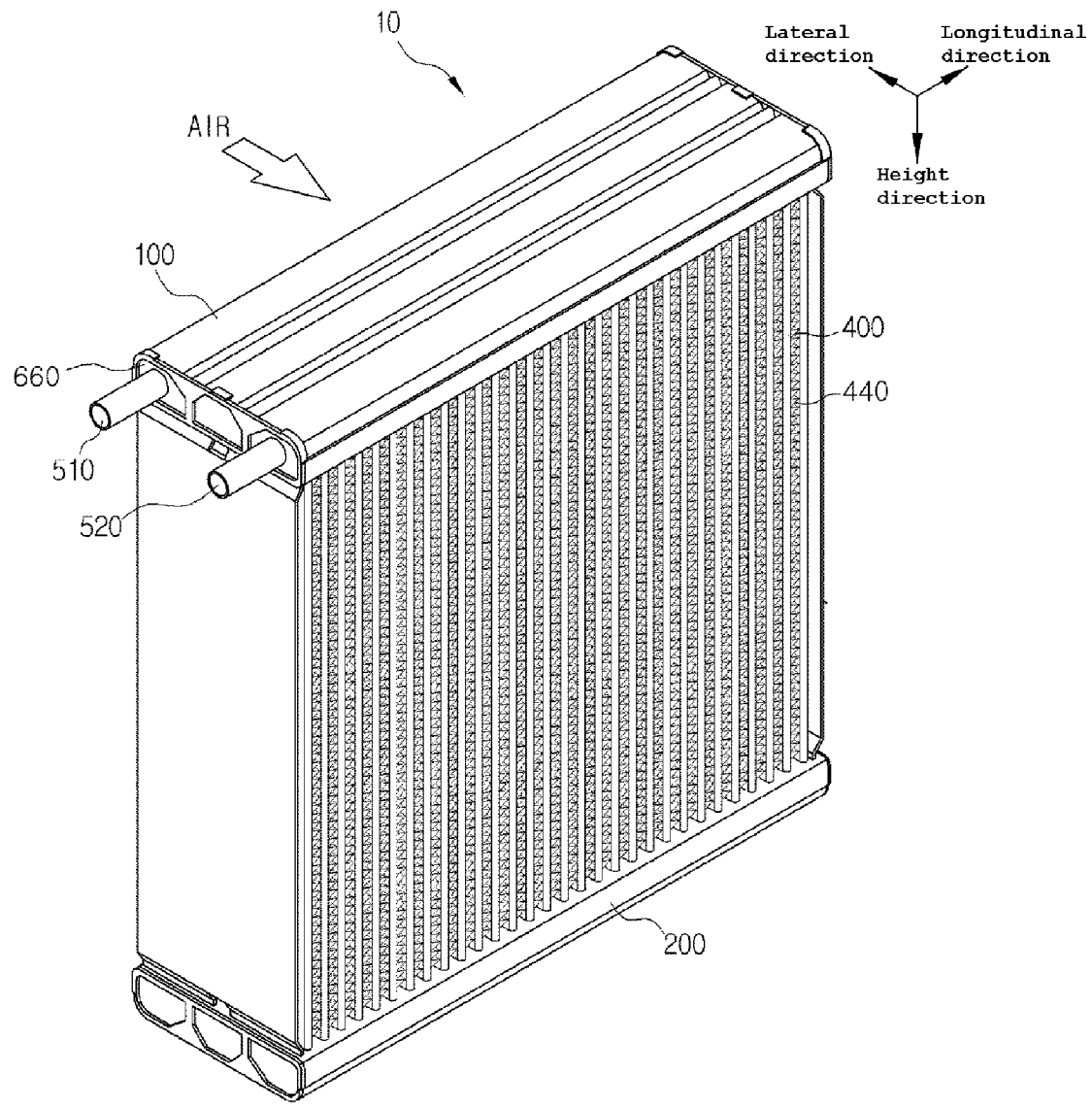
FIGS. 30 through 32 are respectively a perspective view, an exploded perspective and a front view illustrating a cold-storage heat exchanger, according to still another embodiment of the present invention.
Figure 31:
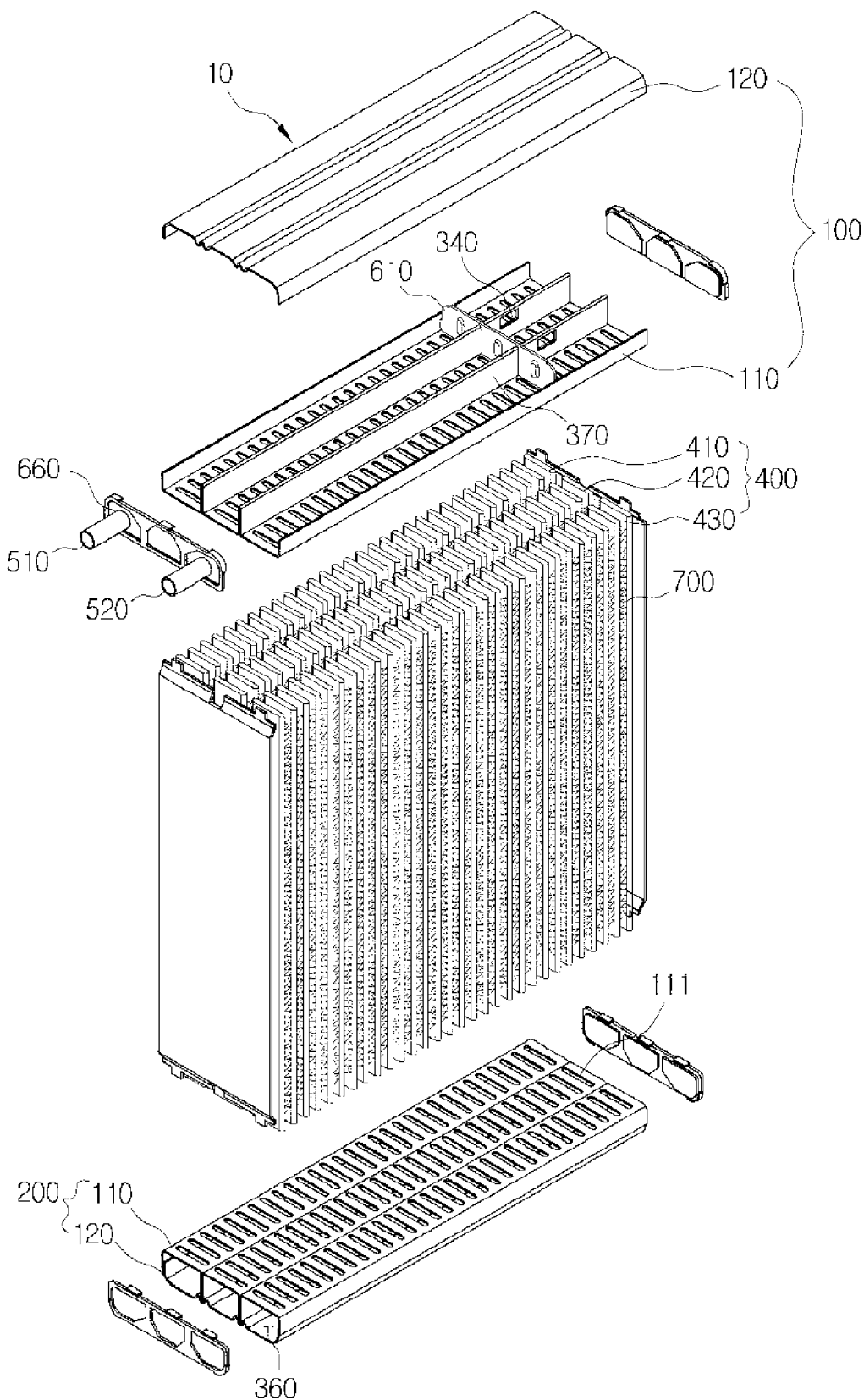
Figure 32:
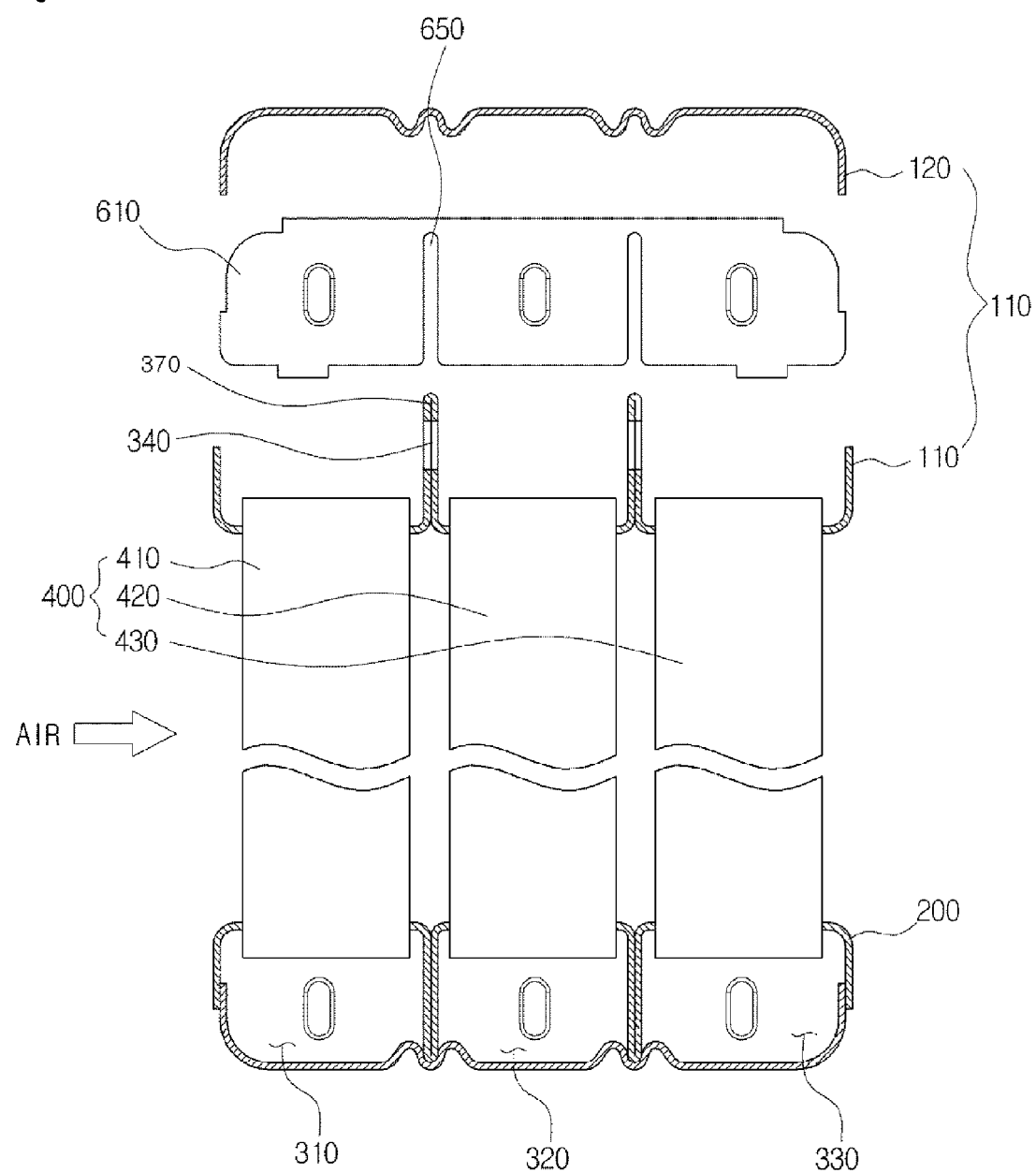

Meanwhile, as shown in FIG. 30, the cold-storage heat exchanger 10 of the present invention may include end caps 660 which seal the openings 130 which are formed in the opposite ends of each of the first header tank 100 and the second header tank 200.

In the cold-storage heat exchanger 10 according to this embodiment the path along which the refrigerant circulates through the refrigerant tubes 410 and 430 can be variously changed depending on the locations of the inlet pipe 510, the outlet pipe 520 and the baffles 620. FIGS. 36 through 39 illustrate different examples of the path along which refrigerant circulates. Hereinafter, for the sake of explanation, it will be assumed that the header tank that is disposed at the upper position in the drawings is the first header tank 100, the header tank that is disposed at the lower position in the drawings is the second header tank 200, the first row of refrigerant tubes 410, the second row of cold-storage tubes 420 and the third row of refrigerant tubes 430 are arranged in order with respect to the direction of airflow, and the first space 310, the second space 320 and the third space 330 are also arranged in order with respect to the direction of airflow.

The flow path of refrigerant in the cold-storage heat exchanger 10 shown in FIG. 36 will now be explained.

Figure 36:
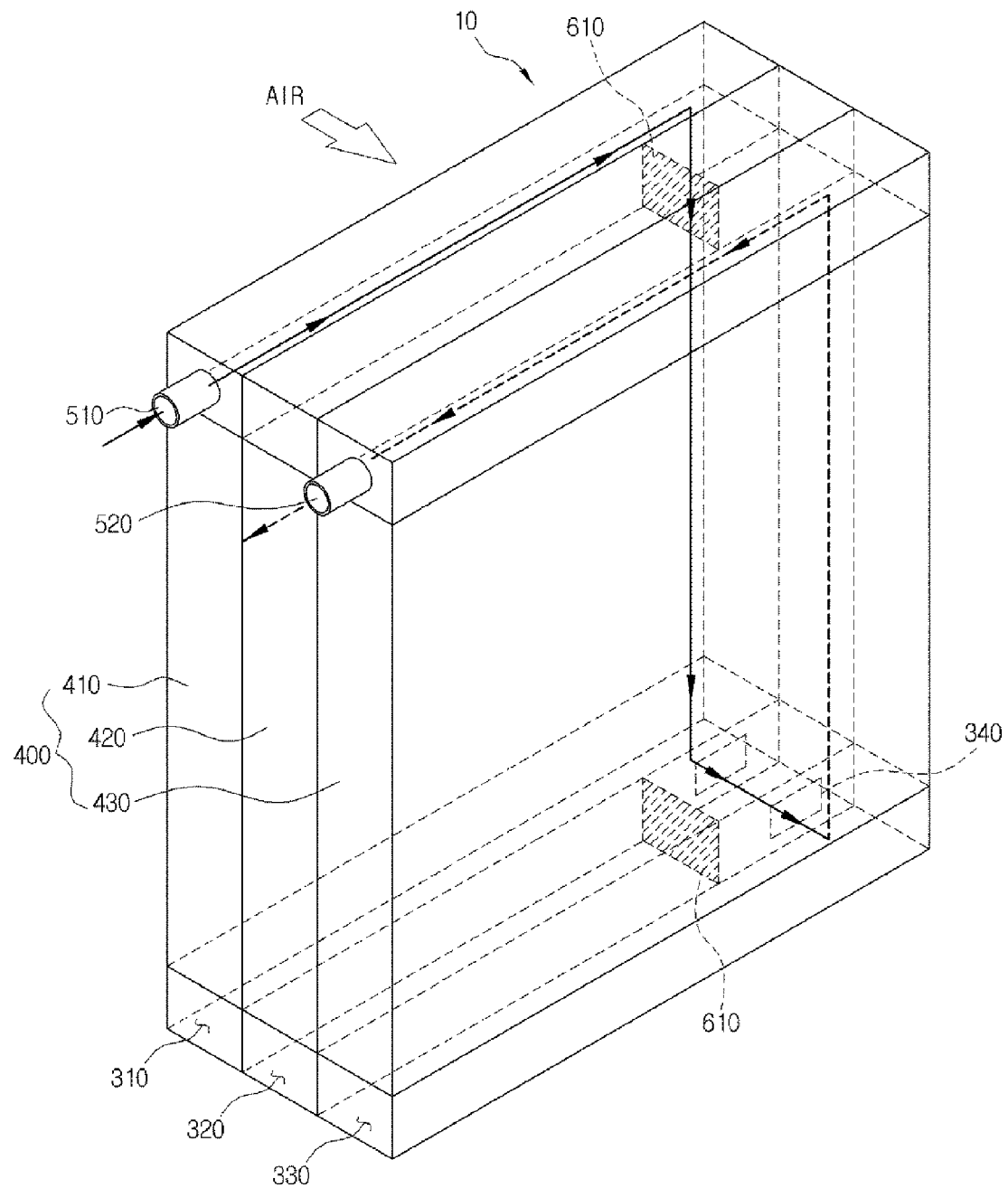
FIGS. 36 through 39 are views showing several embodiments of a path along which a heat exchanging medium circulates in the cold-storage heat exchanger of the present invention.

In the cold-storage heat exchanger 10 of FIG. 36, refrigerant is drawn into the cold-storage heat exchanger 10 through the inlet pipe 510 connected to the first space 310 of the first header tank 100. The drawn refrigerant moves downwards along the first row of refrigerant tubes 410 and flows into the third space 330 of the second header tank 200 through the refrigerant passing holes 340 formed in the second header tank 200.

Thereafter, the refrigerant passes through the third space 330 of the second header tank 200, moves upwards again, and enters the third space 330 of the first header tank 100. Subsequently, the refrigerant is discharged out of the cold-storage heat exchanger 10 through the outlet pipe 520 connected to the third space 330 of the first header tank 100.

Here, a partitioning means 610 is installed in the second space 320 of the first header tank 100 at the same position as that in the second space 320 of the second header tank 200 so that the cold-storage medium can be prevented from mixing with the refrigerant.

In other words, the cold-storage heat exchanger 10 of FIG. 36 is configured such that the refrigerant is drawn into the first space 310 of the first header tank 100 and discharged from the third space 330 of the first header tank 100. Here, thanks to the partitioning means 610 that is provided in the second space 320 so that the cold-storage medium can be prevented from mixing with the refrigerant, the refrigerant can flow from the first space 310 into the third space 330 through the refrigerant passing holes 340 without giving rise to the problem of being mixed with the cold-storage medium.

Therefore, in the cold-storage heat exchanger 10, cold energy of the refrigerant, which circulates through the refrigerant tubes 410 and 430 that are disposed at opposite sides in the direction of airflow, is transferred to and stored in the cold-storage medium that is disposed in the second row of cold-storage tubes 420. Thereby, the cold-storage performance can be enhanced, so that a pleasant air-conditioned environment can be effectively maintained.

Figure 37:
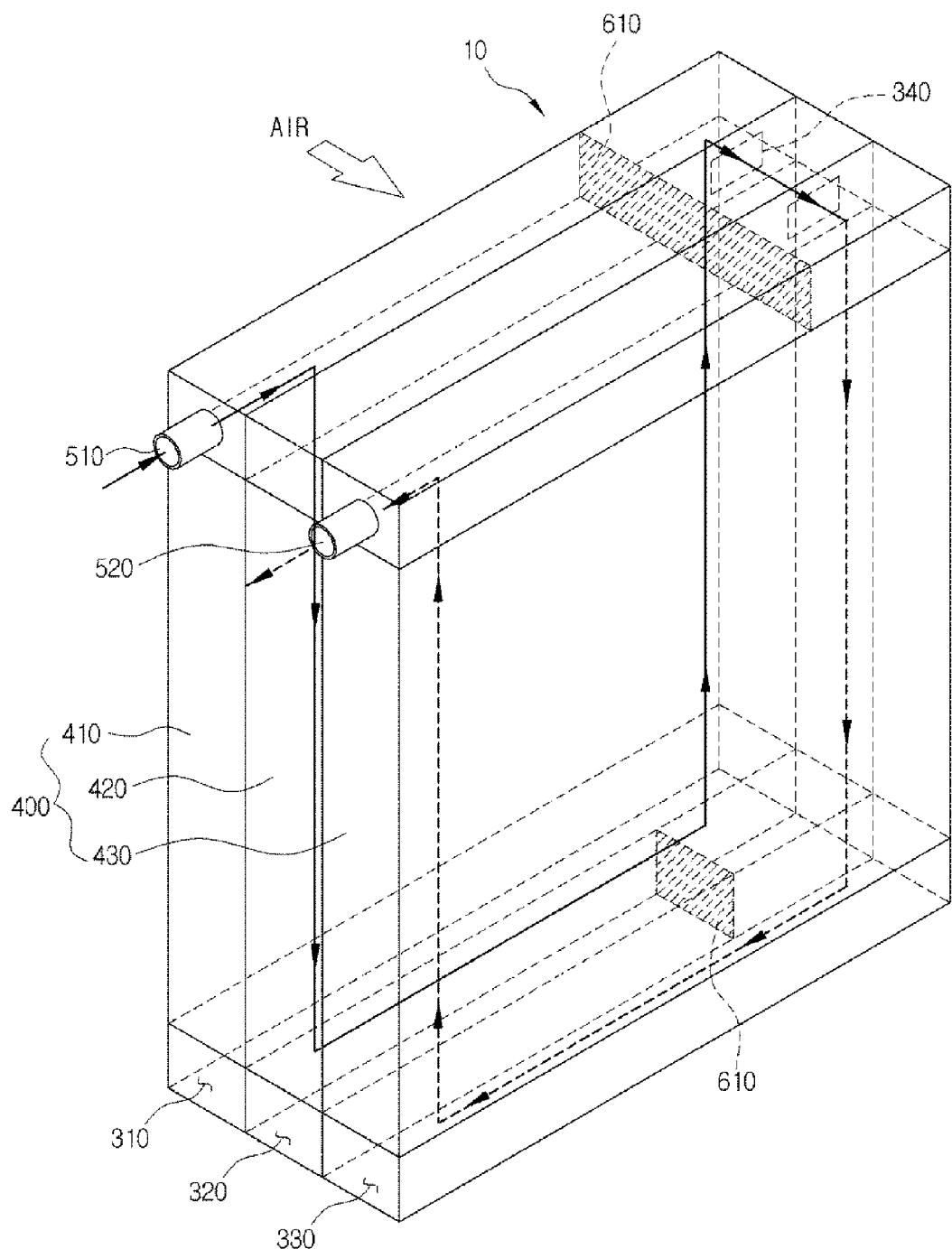

The flow of refrigerant in the cold-storage heat exchanger 10 of FIG. 37 will now be explained, showing another example of the path of circulation of refrigerant. Refrigerant is drawn into the cold-storage heat exchanger 10 through the inlet pipe 510 connected to the first space 310 of the first header tank 100. The drawn refrigerant moves downwards along the refrigerant tubes 410. The refrigerant thereafter passes through the first space 310 of the second header tank 200, moves upwards again, and then flows into the third space 330 of the first header tank 100 through the refrigerant passing holes 340 formed in the first header tank 100.

Subsequently, the refrigerant flows downwards along the third row of refrigerant tubes 430 that are fixed at the opposite ends thereof to the third spaces 330 of the first and second header tanks 100 and 200. Thereafter, the refrigerant passes through the third space 330 of the second header tank 200, moves upwards again, and then enters the third space 330 of the first header tank 100. The refrigerant is subsequently discharged out of the cold-storage heat exchanger 10 through the outlet pipe 520 connected to the third space 330 of the first header tank 100.

The flow of refrigerant in the cold-storage heat exchanger 10 of FIG. 38 will now be explained, showing a further example of the path of circulation of refrigerant. Refrigerant is drawn into the cold-storage heat exchanger 10 through the inlet pipe 510 that communicates with the first space 310 of the first header tank 100. The drawn refrigerant flows along the corresponding refrigerant tubes 410 in an up and down zigzag manner and then reaches again the first space 310 of the first header tank 100. Subsequently, the refrigerant flows into the third space 330 of the first header tank 100 through the refrigerant passing holes 340 that are formed in the first header tank 100.

Thereafter, the refrigerant flows in an up and down zigzag manner along the corresponding refrigerant tube 430 that are fixed at the opposite ends thereof to the third spaces 330 of the first and second header tanks 100 and 200, and then reaches the third space 330 of the first header tank 100. Subsequently, the refrigerant is discharged out of the cold-storage heat exchanger 10 through the outlet pipe 520 that is connected to the third space 330 of the first header tank 100.

Figure 38:
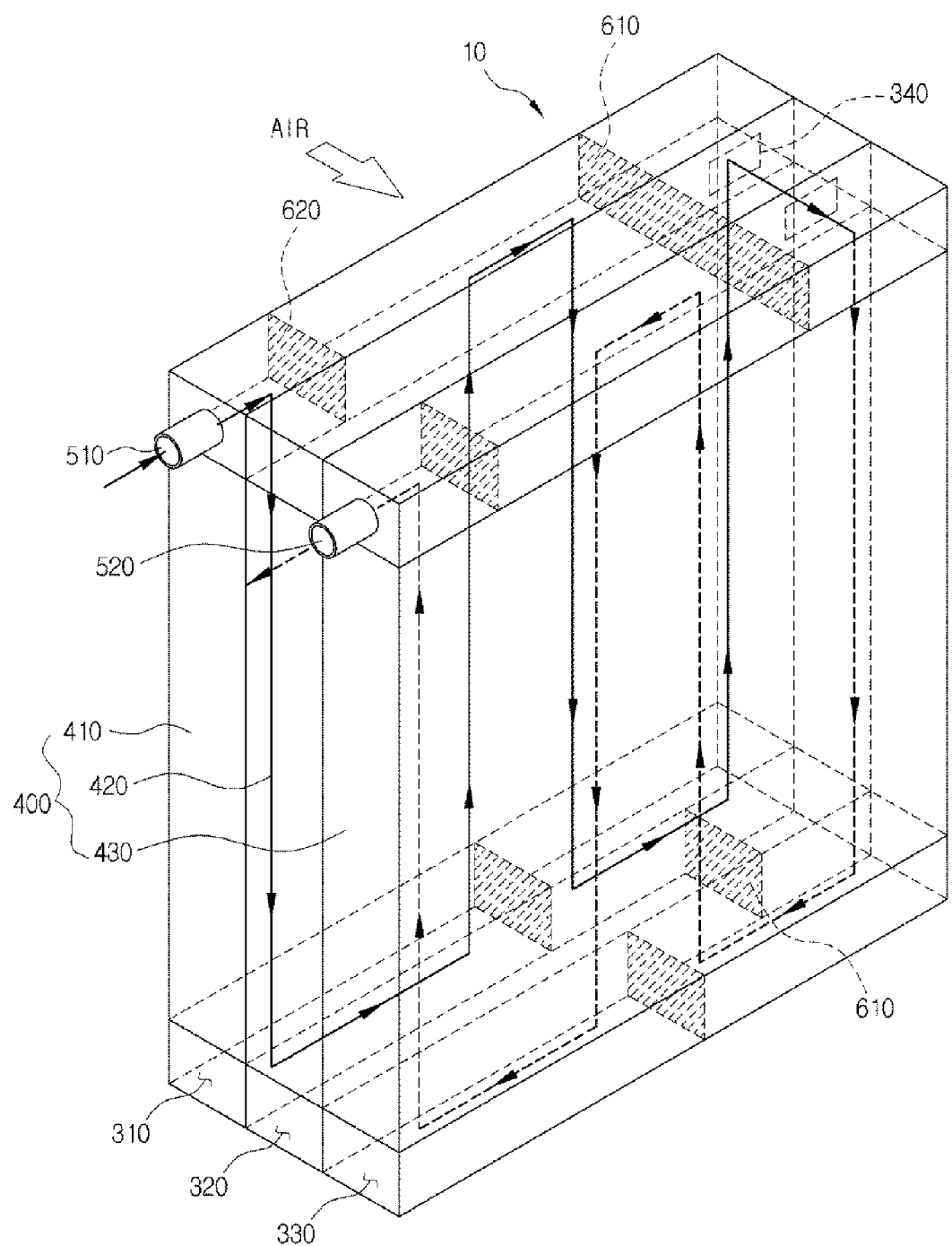
Figure 39:
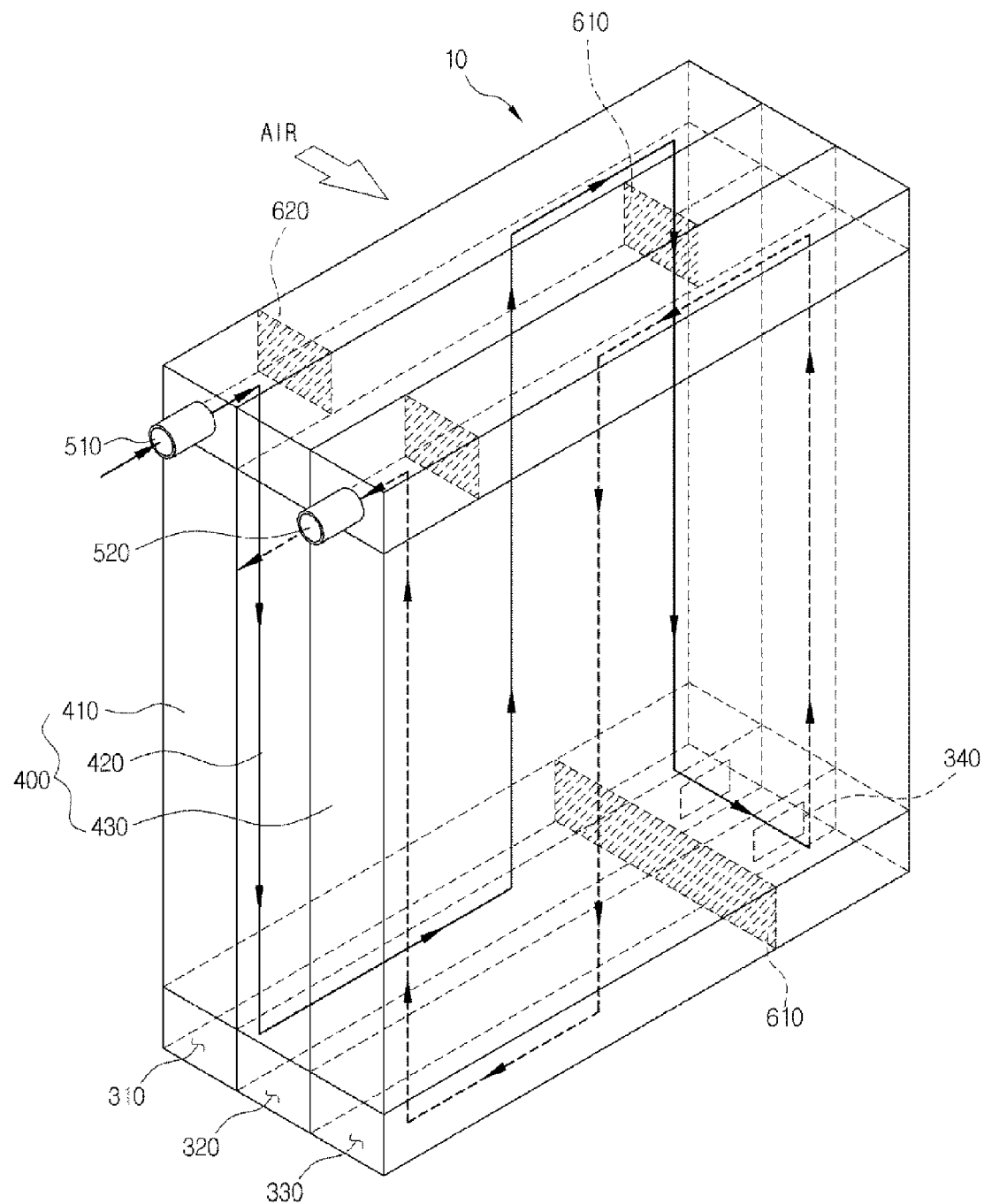

An example of the cold-storage heat exchanger 10 that is illustrated in FIG. 39 is similar to the example of FIG. 38, but in the example of FIG. 39, the number of turns of the zigzag flow path is less than that of the example of FIG. 38, and the refrigerant passing holes are formed in the first and third spaces 310 and 330 of the second header tank 200, unlike that of the example of FIG. 39.

As described above, in the cold-storage heat exchanger 10 of the present invention, the circulation path of the refrigerant can be changed depending on the locations of the inlet pipe 510, the outlet pipe 520, the refrigerant passing holes and the baffles 620 that are provided in the first spaces 310 and the third spaces 330.

Embodiment 9

Figure 29:
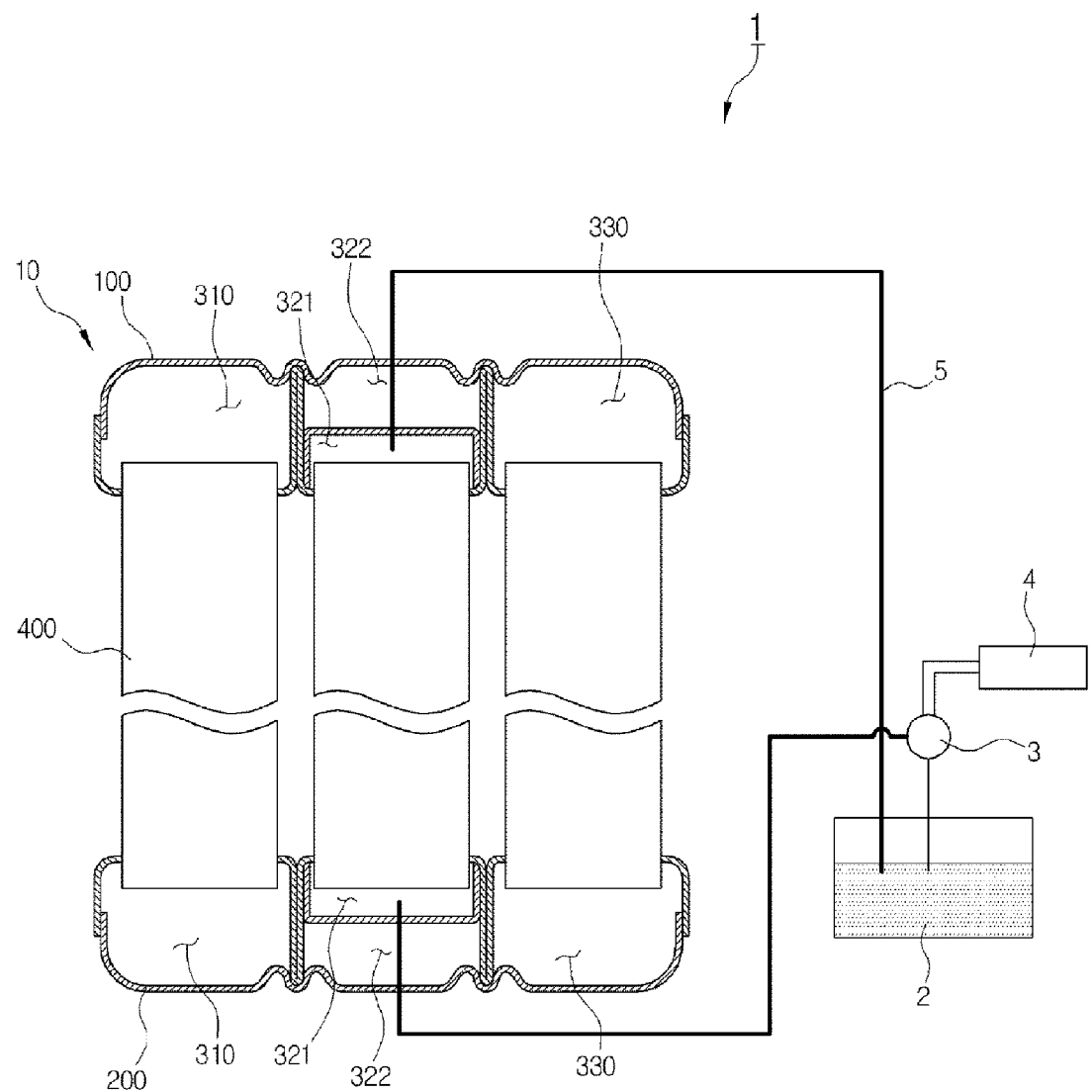
FIG. 29 is a view showing the construction of a cold-storage system including the cold-storage heat exchanger according to the present invention.

As shown in FIG. 29, a cold-storage system 1 including the cold-storage heat exchanger 10 having the above-mentioned construction comprises a reservoir 2, a circulation pump 3, a control unit 4 and a circulation pipe 5. The reservoir 2 stores the cold-storage medium. The circulation pump 3 circulates the cold-storage medium between the reservoir 2 and the cold-storage tubes 420 of the cold-storage heat exchanger 10. The control unit 4 controls the circulation pump 3. The circulation pipe 5 connects the reservoir 2, the circulation pump 3 and the cold-storage tubes 420 of the cold-storage heat exchanger 10 to one another.

The cold-storage system 1 includes the cold-storage heat exchanger 10, and the elements of the cold-storage system 1 that are disposed outside the cold-storage heat exchanger 10 function to circulate the cold-storage medium that is stored in the cold-storage tubes 420.

In the cold-storage system 1, to circulate the cold-storage medium that has been stored in the cold-storage part 730 of the cold-storage heat exchanger 10, the control unit 4 receives information about the temperature and flow rate and operates the circulation pump 3 so that the cold-storage medium that has been stored in the cold-storage part 730 is discharged from the cold-storage part 730 while fresh cold-storage medium that has been in the reservoir 2 is charged into the cold-storage part 730.

The circulation pipe 5 is connected to the second spaces 320 which are disposed in the middle rows of the first header tank 100 and the second header tank 200 of the cold-storage heat exchanger 10.

Therefore, the cold-storage system 1 having the above-mentioned construction can maintain the state of the cold-storage medium suitable for the cold-storage function, thereby enhancing the performance of heat exchange and cold-storage of the cold-storage heat exchanger 10.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A cold-storage heat exchanger, comprising:
a first header tank and a second header tank disposed parallel to each other at positions spaced apart from each other by a predetermined distance, each of the first and second header tanks having therein partitions extending in a longitudinal direction so that a space in each of the first and second header tanks is partitioned with respect to a lateral direction into a first space, a second space and a third space;
a plurality of tubes arranged in three rows with respect to the lateral direction, the plurality of tubes comprising:
refrigerant tubes through which refrigerant circulates, each of the refrigerant tubes being connected at opposite ends thereof to the first spaces of the first and second header tanks respectively or the third spaces of the first and second header tanks respectively; and
a cold-storage tubes connected at opposite ends thereof to the second spaces of the first and second header tanks respectively, the cold-storage tubes storing a cold-storage medium therein;
fins interposed between the plurality of tubes; and
an inlet pipe and an outlet pipe each disposed on the first header tank or the second header tank so that the refrigerant flows into the cold-storage heat exchanger through the inlet pipe and flows out therefrom through the outlet pipe,
wherein a refrigerant passing hole is disposed in a predetermined portion of each of laterally-opposite sidewalls of the second space of at least either the first header tank or the second header tank so that the first space communicates with the third space to allow the refrigerant to flow between the first space and the third space, the cold-storage heat exchanger further comprising: a partitioning means for isolating the refrigerant flowing between the first space and the third space from the heat storage medium stored in the cold-storage tubes,
wherein the second space is partitioned with respect to a height direction by the partitioning means into a primary-second space and a secondary-second space disposed above the primary-second space, and wherein the primary-second space communicates with the cold-storage tubes, and the refrigerant passing holes are disposed in the secondary-second space.

2. The cold-storage heat exchanger of claim 1, comprising: a first heat exchange part in which the refrigerant circulates along the refrigerant tubes that communicate with the first spaces a second heat exchange part in which the refrigerant circulates along the refrigerant tubes that communicate with the third spaces; and a cold-storage part in which the cold-storage medium is stored in the cold-storage tubes that communicate with the primary-second space.

3. The cold-storage heat exchanger of claim 1, wherein the partitioning means comprises a planar member extending in the longitudinal direction so that the second space is partitioned into sections with respect to the height direction, wherein laterally-opposite edges of the planar member are bent so that the planar member is installed in the second space of the first header tank or the second header tank.

4. The cold-storage heat exchanger of claim 1, wherein each of the inlet pipe and the outlet pipe is connected to the first space or the third space of the first or second header tank.

5. The cold-storage heat exchanger of claim 1, wherein the inlet pipe or the outlet pipe communicates with the secondary-second space of the first header tank or the second header tank.

6. The cold-storage heat exchanger of claim 5, wherein the refrigerant passing holes comprise:
inflow branch holes disposed in the secondary-second space communicating with the inlet pipe; and
outflow branch holes disposed in the secondary-second space communicating with the outlet pipe.

7. The cold-storage heat exchanger of claim 6, wherein the inflow branch holes are disposed in the partitions disposed in an area in which the refrigerant drawn into the inlet pipe branches off into the first space and the third space, and the outflow branch holes are disposed in the partitions disposed in an area in which the refrigerant that has passed through the first heat exchange part and the second heat exchange part is drawn into the first space and the third space and discharged into the outlet pipe.

8. The cold-storage heat exchanger of claim 7, wherein the inflow branch holes comprise a first inflow branch hole communicating with the first space, and a second inflow branch hole communicating with the third space, and the outflow branch holes comprise a first outflow branch hole communicating with the first space, and a second outflow branch hole communicating with the third space.

9. The cold-storage heat exchanger of claim 5, further comprising: a pipe connector disposed on an outer surface of one side with respect to the longitudinal direction of the cold-storage heat exchanger,
the pipe connector comprising:
a first pipe connector communicating with the secondary-second space disposed in either the first header tank or the second header tank, so that the refrigerant flows through the first pipe connector, the first pipe connector being connected to the inlet pipe; and
a second pipe connector communicating with the secondary-second space disposed in a remaining one of the first header tank and the second header tank, so that the refrigerant flows through the second pipe connector, the second pipe connector being connected to the outlet pipe.

10. The cold-storage heat exchanger of claim 9, wherein the first pipe connector and the second pipe connector are configured such that the inlet pipe and the outlet pipe are disposed parallel to each other at positions adjacent to each other.

11. The cold-storage heat exchanger of claim 1, further comprising:
a first pipe disposed outside the first header tank and disposed parallel to the first header tank in the longitudinal direction;
a second pipe disposed outside the second header tank and disposed parallel to the second header tank in the longitudinal direction;
a primary-first branch pipe and a secondary-first branch pipe branching off from the first pipe, the primary-first branch pipe extending to the first space of the first header tank while the secondary-first branch pipe extends to the third space of the first header tank; and
a primary-second branch pipe and a secondary-second branch pipe branching off from the second pipe, the primary-second branch pipe extending to the first space of the second header tank while the secondary-second branch pipe extends to the third space of the second header tank,
wherein the first pipe is connected to either the inlet pipe or the outlet pipe, and the second pipe is connected to a remaining one of the inlet pipe or the outlet pipe, so that the refrigerant flows into one of the first pipe and the second pipe or out of the remaining one of the first pipe and the second pipe.

12. The cold-storage heat exchanger of claim 1, further comprising a sealing baffle disposed at a position adjacent to each of openings, the openings being ends of each of the first header tank and the second header tank, or an end cap for sealing each of the openings.

13. The cold-storage heat exchanger of claim 1, wherein a cold-storage-medium injection hole is disposed in the second space so that the cold-storage medium is injected into the second space through the cold-storage-medium injection hole.

14. The cold-storage heat exchanger of claim 1, wherein each of the first header tank and the second header tank is formed by coupling a header to a tank cover plate, each of the header and the tank cover plate being formed by extruding, wherein the partitions are disposed in the header or the tank cover plate so that the space in each of the first and second header tanks is partitioned into the first space, the second space and the third space, and the partitioning means is formed in the second space in the longitudinal direction by integrally extruding the partitioning means with the header or the tank cover plate.

15. The cold-storage heat exchanger of claim 1, wherein each of the first header tank and the second header tank is formed by integrally extruding a header and a tank cover plate, the header and tank cover plate defining the first space, the second space and the third space, and the partitioning means is formed in the second space in the longitudinal direction by integrally extruding the partitioning means with the header or the tank cover plate.

16. The cold-storage heat exchanger of claim 1, wherein the plurality of tubes arranged in the three rows are integrally extruded at a same time.

17. The cold-storage heat exchanger of claim 1, wherein the fins interposed between the plurality of tubes arranged in the three rows are integrally formed.

18. A cold-storage system comprising the cold-storage heat exchanger according to claim 1, the cold-storage system comprising:
a reservoir storing a cold-storage medium;

a circulation pump circulating the cold-storage medium between the reservoir and the cold-storage tubes of the cold-storage heat exchanger;
a control unit controlling the circulation pump; and
a circulation pipe connecting the reservoir, the circulation pump and the cold-storage tubes of the cold-storage heat exchanger to one another.

* * * * *